(12) United States Patent
Kizaki et al.

(10) Patent No.: US 7,927,030 B2
(45) Date of Patent: Apr. 19, 2011

(54) PRINTING CONTROL METHOD AND APPARATUS

(75) Inventors: Junichiro Kizaki, Kanagawa (JP); Satoshi Nishikawa, Kanagawa (JP); Yasuo Mori, Kanagawa (JP); Junko Sato, Kanagawa (JP); Takuya Miyazato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1399 days.

(21) Appl. No.: 11/073,716

(22) Filed: Mar. 8, 2005

(65) Prior Publication Data

US 2005/0146732 A1    Jul. 7, 2005

Related U.S. Application Data

(62) Division of application No. 10/724,761, filed on Dec. 2, 2003, now Pat. No. 6,883,981.

(30) Foreign Application Priority Data

Dec. 5, 2002 (JP) .................................. 2002-353892

(51) Int. Cl.
    *B41J 11/44*  (2006.01)
(52) U.S. Cl. .......................................... 400/76; 400/72
(58) Field of Classification Search ............... 400/76, 400/62, 72
    See application file for complete search history.

(56) References Cited

U.S. PATENT DOCUMENTS

| | | | |
|---|---|---|---|
| 5,923,013 A * | 7/1999 | Suzuki et al. | 235/375 |
| 6,050,732 A | 4/2000 | Tsusaka | 400/76 |
| 6,219,149 B1 * | 4/2001 | Kawata et al. | 358/1.15 |
| 6,278,524 B1 | 8/2001 | Kujirai et al. | 358/1.11 |
| 6,313,919 B1 | 11/2001 | Nakagiri et al. | 358/1.11 |
| 6,337,961 B2 | 1/2002 | Mori et al. | 399/82 |
| 6,509,974 B1 * | 1/2003 | Hansen | 358/1.12 |
| 6,665,081 B1 * | 12/2003 | Suzuki et al. | 358/1.13 |
| 6,857,796 B2 * | 2/2005 | Hatayama | 400/61 |
| 6,883,981 B2 * | 4/2005 | Kizaki et al. | 400/76 |
| 7,188,311 B2 * | 3/2007 | Tanaka et al. | 715/248 |
| 7,307,751 B2 * | 12/2007 | Aritomi | 358/1.18 |
| 2003/0056176 A1 | 3/2003 | Tanaka et al. | 715/522 |
| 2003/0142337 A1 | 7/2003 | Kizaki et al. | 358/1.13 |
| 2003/0184806 A1 | 10/2003 | Nara et al. | 358/1.18 |

OTHER PUBLICATIONS

U.S. Appl. No. 09/465,387, filed Dec. 17, 1999.
U.S. Appl. No. 10/733,296, filed Dec. 12, 2003.

* cited by examiner

*Primary Examiner* — Anthony H. Nguyen
(74) *Attorney, Agent, or Firm* — Fitzpatrick, Cella, Harper & Scinto

(57) ABSTRACT

This invention relates to a printing control method and apparatus, a computer program product, and the like in which printing data is held in a hierarchical structure and a printing job is issued to a printer to cause the printer to print. In the printing control method according to the present invention, different setting values can be set in the lower and upper layers of the hierarchical structure as printing setting data containing double-sided printing or single-sided printing setting. When a setting value different from that of the upper layer is set in the lower layer of the hierarchical structure, the printer is instructed on a setting in the lower layer for each printing data to which the setting value is applied.

9 Claims, 29 Drawing Sheets

FIG. 4A

| NO | ATTRIBUTE INFORMATION | | REMARKS |
|---|---|---|---|
| 1 | PRINT METHOD | SINGLE-SIDED / DOUBLE-SIDED / BOOKBINDING PRINTING | |
| 2 | PAPER SIZE | ORIGINAL SIZE / FIXED SIZE | · Z-FOLD IS DESIGNATED WHEN "A4 + A3", "B4 + B3", OR "LETER + LEDGER (11 × 17)" IS DESIGNATED<br>· ORIGINAL SIZE OF FIRST CHAPTER / PAGE IS AUTOMATICALLY SELECTED WHEN BOOKBINDING PRINTING OR N-up PRINTING IS DESIGNATED |
| 3 | PAPER DIRECTION | PORTRAIT / LANDSCAPE | · SELECTABLE ONLY FOR FIXED SIZE |
| 4 | BINDING MARGIN / BINDING DIRECTION | | · SHIFT / ENLARGEMENT & REDUCTION CAN BE DESIGNATED |
| 5 | N-up PRINTING | NUMBER OF PAGES / LAYOUT ORDER / BOUNDARY / LAYOUT POSITION, etc. | · LAYOUT POSITION : NINE PATTERNS<br>· X1 PRINTING CAN BE DESIGNATED |
| 6 | ENLARGEMENT / REDUCTION | ON / OFF | ON / OFF CAN BE AUTOMATICALLY DESIGNATED WHEN PAPER SIZE IS FIXED SIZE OR N-up PRINTING IS SELECTED |
| 7 | WATERMARK | | · WATERMARK CAN BE DESIGNATED INDIVIDUALLY IN LOGICAL OR PHYSICAL PAGES<br>· ALL CHAPTERS / PAGES ARE TARGETED |

FIG. 4B

| | | | |
|---|---|---|---|
| 8 | HEADER/FOOTER | | • HEADER/FOOTER CAN BE DESIGNATED INDIVIDUALLY IN LOGICAL OR PHYSICAL PAGES<br>• ALL CHAPTERS/PAGES ARE TARGETED |
| 9 | DELIVERY METHOD | STAPLING/PUNCH HOLE | • STAPLING/PUNCHING ONLY IN SINGLE-/DOUBLE-SIDED PRINTING<br>• STAPLING AT ONE/TWO PORTIONS |
| 10 | DETAILS OF BOOKBINDING | OPENING DIRECTION/SADDLE STITCH/ENLARGEMENT & REDUCTION DESIGNATION/BINDING MARGIN/FASCICLE DESIGNATION, etc. | • ONLY IN BOOKBINDING PRINTING |
| 11 | FRONT/BACK COVER | | • PRINTING IS DESIGNATED FOR 1/2 FRONT COVER OR 1/2 BACK COVER<br>• FEED PORT (INCLUDING INSERTER) IS DESIGNATED |
| 12 | INDEX SHEET | | • PRINTING OF CHARACTER STRING ON INDEX PORTION OR ANNOTATION ON INDEX SHEET CAN BE SET<br>• BOOKBINDING PRINTING CANNOT BE DESIGNATED |
| 13 | SLIP SHEET | | • FEED PORT (INCLUDING INSERTER) IS DESIGNATED<br>• ORIGINAL DATA CAN BE PRINTED ON INSERTED PAPER<br>• BOOKBINDING PRINTING CANNOT BE DESIGNATED |
| 14 | CHAPTERING | "NONE"/"PAGE BREAK"/"PAPER CHANGE" | • "PAPER CHANGE" IS FIXED WHEN INDEX SHEET OR SLIP SHEET IS DESIGNATED<br>• "PAPER CHANGE" IN SINGLE-SIDED PRINTING |

FIG. 5

| NO | ATTRIBUTE INFORMATION | | REMARKS |
|---|---|---|---|
| 1 | PAPER SIZE | ORIGINAL SIZE / FIXED SIZE | • "PAPER CHANGE" IS AUTOMATICALLY DESIGNATED WHEN FIXED SIZE IS SELECTED<br>• WHEN A PLURALITY OF PAPER SHEETS ARE SELECTED BY BOOK, PAPER SIZE CAN BE CHANGED TO ONLY DESIGNATED PAPER. PAPER SIZE CAN BE CHANGED EVEN WITH DESIGNATION COMPLYING WITH BOOK |
| 2 | PAPER DIRECTION | PORTRAIT / LANDSCAPE | • SELECTABLE ONLY FOR FIXED SIZE |
| 3 | N-up PRINTING DESIGNATION | NUMBER OF PAGES / LAYOUT ORDER / BOUNDARY / LAYOUT POSITION, etc. | • LAYOUT POSITION : NINE PATTERNS<br>• X1 PRINTING CAN BE DESIGNATED |
| 4 | ENLARGEMENT / REDUCTION | ON / OFF | • ON / OFF CAN BE AUTOMATICALLY DESIGNATED WHEN PAPER SIZE IS FIXED SIZE OR N-up PRINTING IS SELECTED |
| 5 | WATERMARK | DISPLAY / NON-DISPLAY | • WHETHER TO DISPLAY ALL WATERMARKS DESIGNATED BY BOOK IS DESIGNATED |
| 6 | HEADER / FOOTER | DISPLAY / NON-DISPLAY | • WHETHER TO DISPLAY ALL HEADERS / FOOTERS DESIGNATED BY BOOK IS DESIGNATED |
| 7 | DELIVERY METHOD | STAPLING | • STAPLING CAN BE SET OFF WHEN STAPLING IS DESIGNATED BY BOOK<br>DEFAULT VALUE IS "ON" |

FIG. 6

| NO | ATTRIBUTE INFORMATION | | REMARKS |
|---|---|---|---|
| 1 | PAGE ROTATION DESIGNATION | | • 0°/90°/180°/270° CAN BE DESIGNATED |
| 2 | WATERMARK | DISPLAY / NON-DISPLAY | • WHETHER TO DISPLAY ALL WATERMARKS DESIGNATED BY BOOK IS DESIGNATED |
| 3 | HEADER / FOOTER | DISPLAY / NON-DISPLAY | • WHETHER TO DISPLAY ALL HEADERS / FOOTERS DESIGNATED BY BOOK IS DESIGNATED |
| 4 | ZOOM | 50% - 200% | • MAGNIFICATION RELATIVE TO SIZE WHICH IS FIT IN VIRTUAL LOGICAL PAGE REGION AND SET AS 100% IS DESIGNATED |
| 5 | LAYOUT POSITION | | • NINE FIXED PATTERNS AND ARBITRARY POSITION CAN BE DESIGNATED |
| 6 | ANNOTATION | | |
| 7 | VARIABLE ITEM | | |
| 8 | PAGE DIVISION | | |

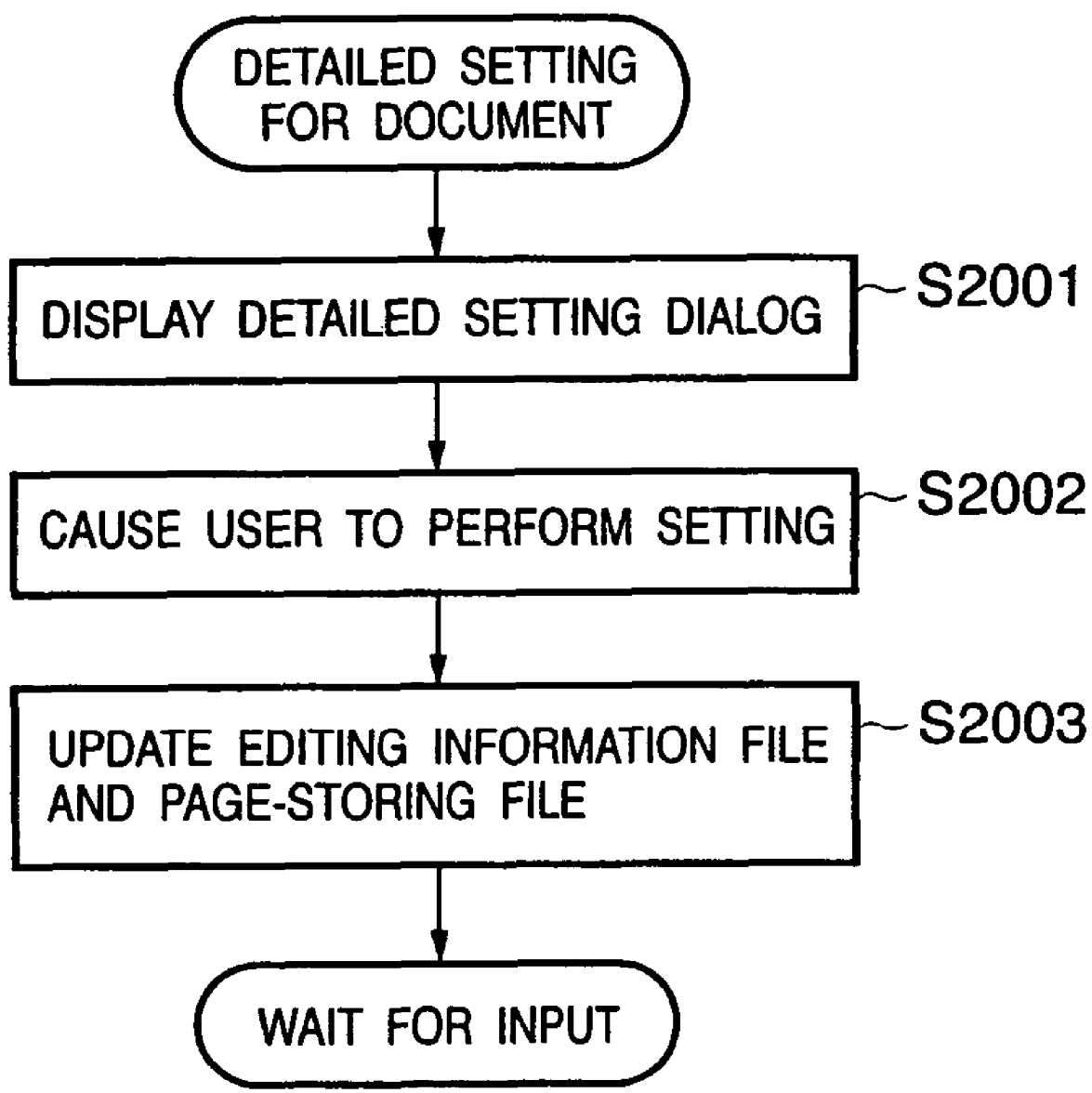

PRINTING CONTROL METHOD AND APPARATUS

This application is a divisional application of U.S. application Ser. No. 10/724,761, filed Dec. 2, 2003, now allowed.

FIELD OF THE INVENTION

The present invention relates to a printing control method and apparatus which combine output data generated by various programs such as a document processing program and image editing program into one document, provide an editing function for the document, and issue a printing job to a printing apparatus to cause the printing apparatus to print.

BACKGROUND OF THE INVENTION

When a printer prints document data, image data, or the like generated by an application program for document processing, image processing, or the like that is executed by a computer, the user can change printing settings within the range of functions provided by the application, printer, operating system, and the like. In general, printing settings are given for each printing job which is a printing processing execution unit for a set of data to be printed, control codes, and the like. For example, when the user is to print one document at different settings, parts having common settings are printed as one printing job. The user must perform this operation for a plurality of printing settings, and then combine printouts into a document. In other words, as far as data are printed by one printing job, common printing settings are applied to each part.

For this reason, one printing job cannot include partially different printing settings such as double-sided printing parts and single-sided printing parts. To print a document including double-sided printing parts and single-sided printing parts, only the following methods are selected.

(1) As described above, double-sided printing parts and single-sided printing parts are printed by separate printing jobs, and then combined into a document by the user.

(2) As for single-sided printing parts, blank pages corresponding to lower surfaces are inserted in advance by the user every other printing page (which is one surface of a printing sheet and also called a physical page). A completed document is printed in accordance with double-sided printing setting. In this case, blank pages may be inserted by executing a program having a blank sheet insertion function by a computer.

Method (1) causes the user to work, and the user is constrained to printing work at low productivity.

In method (2), originally unnecessary blank pages must be printed. This prolongs the time taken for printing processing, decreasing the productivity. When a maintenance contract to charge the user for each page is made for a printer for use between the user and the manufacturer or the like, the user is also charged even for a blank page inserted at a single-sided printing part.

In this manner, single-sided printing or double-sided printing can only be set for each printing job. Demands have arisen for dividing a printing job and generating the entity of data to be printed in accordance with printing settings.

SUMMARY OF THE INVENTION

The present invention has been made in consideration of the above situation, and has as its object to provide an information processing apparatus, printing data generation method, and printing control program which can print a document including both single-sided printing and double-sided printing by one printing job, create an expressive document, and perform efficient printing in terms of the speed and maintenance cost without printing any wasteful blank page by generating a printing job which holds single-sided printing or double-sided printing setting as a partial setting value in a document to be printed, and causing a printer to execute the printing job.

The present invention has been made in consideration of the above situation, and comprises the following arrangement.

(1) A printing control method of holding printing data in a hierarchical structure and issuing a printing job to a printer to cause the printer to print comprises a setting step capable of setting different setting values in a lower layer and an upper layer of the hierarchical structure as printing setting data containing double-sided printing or single-sided printing setting, and an instruction step of, when a setting value different from a setting value of the upper layer is set in the lower layer of the hierarchical structure, instructing the printer on a setting in the lower layer for each printing data to which the setting value is applied.

(2) In (1), the setting step includes a determination step of determining whether the printer copes with a change in the printing setting data during a printing job, and when the printer is determined to cope with the change, different setting values can be set in the lower layer and the upper layer of the hierarchical structure.

(3) In (1), the method further comprises a printer setting step of setting a printer for use, and in the printer setting step, whether a newly set printer copes with a change in the printing setting data during a printing job is determined, and when the printer is determined not to cope with the change and different setting values are set in the lower layer and the upper layer, setting is so changed as to make the setting value of the lower layer coincide with the setting value of the upper layer.

(4) In (3), in the printer setting step, when the newly set printer is determined not to cope with the change in the printing setting data during the printing job and different setting values are set in the lower layer and the upper layer, a warning to change setting is generated to a user before setting is so changed as to make the setting value of the lower layer coincide with the setting value of the upper layer.

(5) In (1), a setting in the upper layer includes a setting of a whole document, and a setting in the lower layer includes a setting of a chapter obtained by dividing the document.

(6) Alternatively, a document processing method of processing original data having a printing format as an attribute, comprises a step of giving an attribute to each node and holding the original data in a tree structure; and a step of setting, as an attribute of the entire original data, an attribute representing whether to print on only one side or two sides of a paper sheet, setting, as an attribute of each node, an attribute representing printing on only one side or the two sides of the paper sheet, allowing independently setting the attributes, and switching a printing method in accordance with the attribute.

(7) In (6), when an output apparatus cannot switch the printing method during printing, setting of the attribute at each node is inhibited.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B are tables showing a list of book attributes;

FIG. 5 is a table showing a list of chapter attributes;

FIG. 6 is a table showing a list of page attributes;

FIGS. 20A and 20B are flow charts when a printing format is set according to the embodiment;

DETAILED DESCRIPTION OF THE PREFERRED EMBODIMENT

A preferred embodiment of the present invention will be described in detail below with reference to the accompanying drawings.

[Outline of Document Processing System According to Embodiment]

The outline of a document processing system according to an embodiment of the present invention will be described with reference to FIGS. 1 to 13. The document processing system converts a data file created by a general application into a page-storing file by a printing data save driver. A printing control application provides a function (editing function) of editing an electronic original file, and a function (printing setting function) of setting a printing format. The editing function includes a function of changing the page order of the document of an electronic original file, and a function of managing a whole document, chapters, and pages in a hierarchical structure. The printing setting function enables the printing layout such as double-sided printing/single-sided printing/bookbinding printing, the printing format such as stapling/non-stapling and stapling position, and various settings such as color printing/monochrome printing, which are conventionally set as the properties of a printer driver. As the feature of the printing setting function, various settings described above can be individually set in a predetermined unit (whole document, chapter, or page) divided by the editing function. These settings are independent of a printer driver, unlike conventional settings by a printer driver. A printing control application 104 according to the present invention can perform various printing settings independently of a printer driver 106 at an output destination. For a page-storing file edited by the printing control application, an editing information file corresponding to the page-storing file is generated and saved. The contents of the page-storing file are read out for printing by a printing application (also called a despooler) via the printing control application. In this example, a general application, printing data save driver, printing control application, and printing application are separately described for distinction between these functions. However, a package provided to the user is not limited to them, and an application or graphic engine as a combination of them may be provided, details of which will be described below.

<Example of Hardware Configuration of Document Processing System According to Embodiment>

Figure 2:
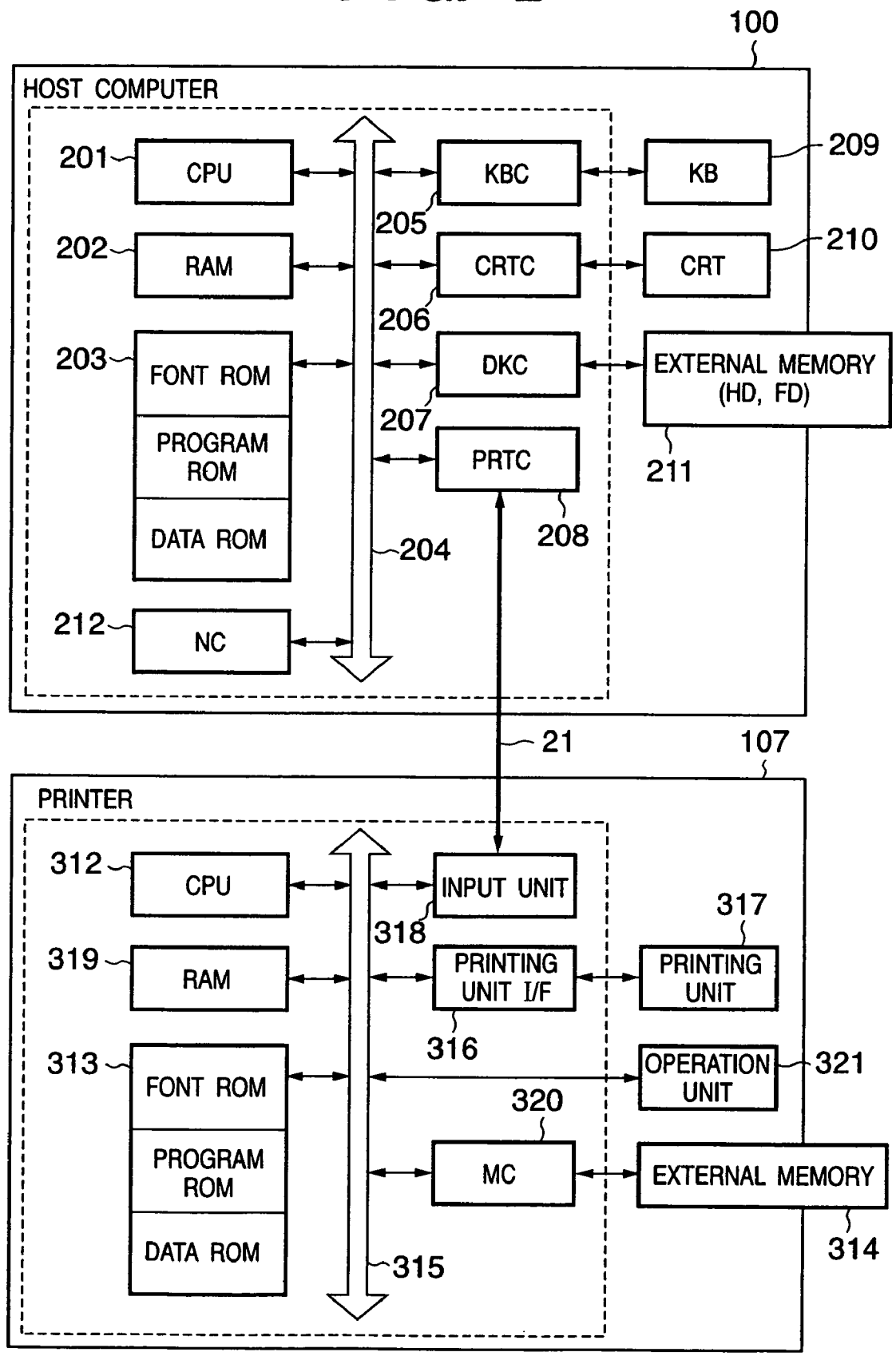
FIG. 2 is a block diagram showing an example of a hardware configuration which implements the document processing system according to the embodiment.

FIG. 2 is a block diagram for explaining the configuration of the document processing system according to the embodiment. The present invention can be applied to a single apparatus, a system comprised of a plurality of devices, or a system which is connected via a network such as a LAN or WAN and performs processing, as far as the function of the present invention is executed.

In FIG. 2, a host computer 100 comprises a CPU 201, RAM 202, ROM 203, and the like. The CPU 201 executes document processing in which figures, images, characters, tables (including spreadsheets and the like), and the like coexist, on the basis of a document processing program or the like stored in the program ROM of the ROM 203 or an external memory 211. The CPU 201 comprehensively controls devices connected to a system bus 204. The program ROM area of the ROM 203 or the external memory 211 stores, e.g., an operating system program (to be referred to as an OS hereinafter) serving as the control program of the CPU 201. The font ROM area of the ROM 203 or the external memory 211 stores, e.g., font data used in document processing. The data ROM area of the ROM 203 or the external memory 211 stores various data used in document processing or the like. The RAM 202 functions as a main memory, work area, or the like for the CPU 201.

A keyboard controller (KBC) 205 controls a key input from a keyboard 209 or a pointing device (not shown). A CRT controller (CRTC) 206 controls the display of a CRT display (CRT) 210. A disk controller (DKC) 207 controls access to the external memory 211 such as a hard disk (HD) or floppy® disk (FD). The external memory 211 stores a boot program, various applications, font data, user files, edited files, a printer control command generation program (to be referred to as a printer driver hereinafter), and the like. A printer controller (PRTC) 208 is connected to a printer 107 via a bidirectional interface (interface) 21, and executes communication control processing with the printer 107.

The CPU 201 executes, e.g., rasterization processing of an outline font to a display information RAM set in the RAM 202, and enables WYSIWYG on the CRT display 210. The CPU 201 opens various registered windows and executes various data processes on the basis of commands designated on the CRT 210 with a mouse cursor (not shown) or the like. When the user executes printing, he/she opens a printing setting window provided by the printer driver, and can perform setting of a printer and setting of a printing processing method to the printer driver that includes selection of a printing mode.

The printer 107 is controlled by a CPU 312. The printer CPU 312 outputs an image signal as output information to a printing unit (printer engine) 317 connected to a system bus 315 on the basis of a control program stored in the program ROM area of a ROM 313 or a control program stored in an external memory 314. The program ROM area of the ROM 313 stores, e.g., the control program of the CPU 312. The font ROM area of the ROM 313 stores, e.g., font data used to generate the output information. The data ROM area of the ROM 313 stores, e.g., information used in the host computer for a printer having no external memory 314 such as a hard disk.

The CPU 312 can communicate with the host computer via an input unit 318, and notify the host computer 100 of internal printer information or the like. A RAM 319 functions as a main memory, work area, or the like for the CPU 312, and the memory capacity can be expanded by an optional RAM connected to an expansion port (not shown). The RAM 319 is used as an output information mapping area, environment data storage area, NVRAM, or the like. Access to the external memory 314 such as a hard disk (HD) or IC card is controlled by a memory controller (MC) 320. The external memory 314 is connected as an option, and stores font data, emulation programs, form data, and the like. Reference numeral 321 denotes an operation panel having operation switches, an LED display, and the like.

The number of external memories 314 is not limited to one, and a plurality of external memories 314 may be arranged. A plurality of external memories which store an option card and a program for interpreting the printer control languages of different language systems in addition to built-in fonts may be connected. Further, an NVRAM (not shown) may be adopted to store printer mode setting information from the operation panel 321.

<Example of Software Configuration of Document Processing System According to Embodiment>

Figure 1:
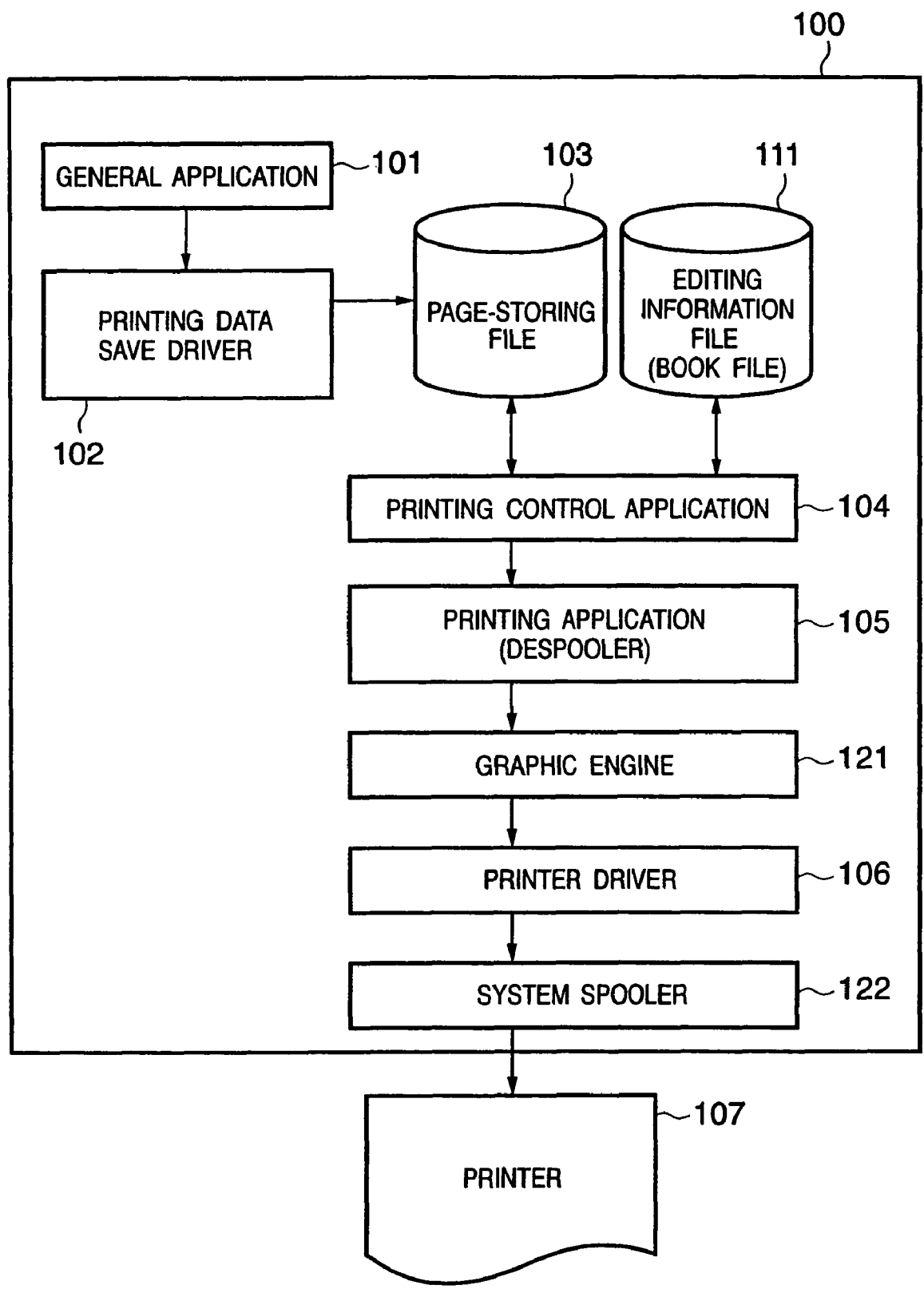
FIG. 1 is a block diagram showing an example of the software configuration of a stand-alone document processing system according to an embodiment.

FIG. 1 is a block diagram showing the software configuration of the document processing system according to the embodiment.

The document processing system is implemented by a digital computer 100 (to be also referred to as a host computer hereinafter) as an embodiment suited to the document processing apparatus (information processing apparatus) of the present invention. A general application 101 is an application program which provides functions such as wordprocessing, spreadsheet, photo-retouch, draw, paint, presentation, and text editing. The general application 101 has a function of requesting printing processing of an operating system (OS). Such applications utilize a predetermined interface provided by the OS in printing application data such as created document data or image data. To print created data, the application 101 transmits an output command in a predetermined format to the output module of the OS providing the interface. The output module which has received the output command converts it into a format processible by an output device such as a printer, and outputs the converted command. Since the format processible by the output device changes depending on the type of device, the manufacturer, and the model, a device driver is provided for each device. The OS converts a command by using the device driver, generates printing data, and combines printing data by JL (Job Language) to generate a printing job.

When the OS is Microsoft Windows®, the output module is a GDI (Graphic Device Interface) module. The application 101 calls a GDI function by using the created data as a parameter of a format complying with the GDI. As a result, the above-described output command is sent to the OS.

A printing data save driver 102 is an improvement of the above-mentioned device drivers, and is a software module provided to implement the document processing system. The printing data save driver 102 does not target a specific output device, and converts an output command into a format processible by the printing control application 104 or printer driver 106 (to be described later). The format (to be referred to as a "page-storing file format" hereinafter) converted by the printing data save driver 102 is not particularly limited as far as the document structure and each original page can be expressed by a detailed format. As the format which expresses each original page, the PDF format by Adobe Systems and the SVG format can be adopted as page-storing files.

In the embodiment, a page-storing file 103 and editing information file 111 are processed as separate files, but when no file is opened, are combined as an archive file in order to hold the unity.

In the system shown in FIG. 1, data contents saved in the page-storing file 103 can be processed. This realizes a function not provided to an application which creates an original, such as a function of enlarging/reducing printing data from an application or a function of reducing a plurality of pages into one page and printing the page. For this purpose, the system in FIG. 1 is expanded from a conventional one so as to spool intermediate code data. Processing of printing data is generally set through a window provided by the printing control application 104, and the setting contents are saved in the RAM 202 or external memory 211.

As shown in FIG. 1, according to the extended processing method, printing data from the application 101 is saved as the page-storing file 103 in the system via the printing data save driver 102. The page-storing file 103 is also called an intermediate file, and contains content data of a print material, printing setting data, and the like. Content data of a print material is data prepared by converting data created in an application by the user into an intermediate code. Printing setting data is data which describes how to output content data (output format or the like). In addition, the page-storing file 103 contains application extension data called an editing information file for providing a user interface when the printing control application causes the user to edit the contents of a page-storing file or issue an output instruction.

The contents of the page-storing file 103, and particularly printing setting data are updated by the printing control application 104. The printing control application 104 can display printing settings such as the output format, cause the user to change printing settings, and save the changed settings. At this time, printing settings are also reflected in attribute data of the editing information file together with printing setting data of the page-storing file.

Printing processing is actually executed by the printing application (despooler) 105. The printing application (despooler) 105 which has received a printing command from the printing control application 104 inputs data to a graphic engine 121 in a predetermined format such as a GDI function in accordance with the output format set by the printing control application 104. The graphic engine 121 converts the input data of the GDI function format or the like into a DDI function, and outputs the DDI function to the printer driver 106. The printer driver 106 generates a printer control command of the page description language or the like on the basis of the DDI function acquired from the graphic engine 121, and outputs the command to the printer 107 via a system spooler 122. FIG. 1 illustrates one printer driver 106 for descriptive convenience. However, the printing application 104 of the present invention is independent of the printer driver, and in printing, an arbitrary printer driver can be selected as an output destination from a plurality of printer drivers which are held in the document processing apparatus (information processing apparatus) 100, similar to a general application.

<Example of Data Format of Permanent File>

Before a detailed description of the printing control application 104, the data format of the page-storing file will be described. The page-storing file contains data of each original page (data of each page generated by an application: to be also referred to as a logical page) as content data, and data of a job ticket format as printing setting data. An editing information file for changing setting of printing setting information contained in the page-storing file is also stored by the printing control application (to be described later) together with the page-storing file. In some cases, a DEVMODE structure for sending a printing instruction to a driver by using a GDI function is contained.

In the page-storing file, original page data is defined by the PDF format or the like, and contains designation of the character font and color, and layout information of characters, figures, and the like within an original page. In the page-storing file, original page data of the PDF format and data of the job ticket format are intermediate data.

The job ticket serving as a page-storing file is data having a structure whose minimum unit is an original page. The structure of the job ticket defines the layout of an original page on a paper sheet. The node of the whole document is set at the top of the structure, and defines the attribute of the whole document such as double-sided printing/single-sided printing. This node is accompanied with a document structure and information representing setting of each building component. More specifically, a sheet bundle node belongs to the document node, and contains attributes such as the identifier of paper for use and designation of a feed port in the printer. The node of a sheet contained in the sheet bundle belongs to each sheet bundle node. One sheet corresponds to one paper sheet. A printing page (physical page) belongs to each sheet. One physical page belongs to one sheet in single-sided printing, and two physical pages belong to one sheet in double-sided printing. An original page to be laid out on a physical page belongs to the physical page. The physical page attribute contains an original page layout. An original page contains association information (link information) to original page data which is the entity of the original page. Each node is given a setting value such as the printing format.

Settings of the whole document include pieces of following information.

(1) Layout information (e.g., so-called N-up printing setting of laying out N pages on one physical page) and order of original pages on a physical page (sheet surface of a printing medium)
(2) Document name
(3) Double-sided designation or not
(4) Variable printing (technique of embedding separately prepared data in the contents of a predetermined column and printing the resultant data) or not
(5) The number of contained original pages
(6) Color type
(7) The number of copies, etc.
(8) Watermark (ground pattern superposed on an original page or printing page)
(9) Printer state
(10) Medium type
(11) Logical page number list on a sheet
(12) Printing quality, etc.

As for printing settings of each sheet bundle, the following parameters can be set.
(13) Designation of N-up printing
(14) Color type
(15) Paper source As for printing settings of each sheet belonging to each sheet bundle, the following parameter can be set.
(16) Setting of double-sided/single-sided printing As for printing settings of each physical page (plane) belonging to each sheet, the following parameters can be set.
(17) Color type
(18) Designation of an upper or lower plane As for printing settings of each original page laid out on each physical page, the following parameters can be set.
(19) Start coordinates
(20) Size
(21) Order In this manner, the job ticket is data having a hierarchical structure whose minimum unit is an original page. Most of printing settings defined by the job ticket are common on each layer set for each document, but some printing settings such as N-up setting and color type are common between layers. In principle, as for a common setting, a lower layer inherits the same setting value as that of an upper layer. When an attribute common between layers has different values, a value set for a layer of interest is used as the value of the attribute. For example, the color type can be set for a whole document, sheet bundle (set of sheets), and physical page (to be also referred to as a plane or printing page). The color type is a setting which designates a mode in the printing apparatus. Printing data is generated such that, if the monochrome mode is set, the printing apparatus prints in monochrome; if the color mode is set, prints in color. Double-sided printing can be set for a whole document and sheet bundle.

Figure 12:
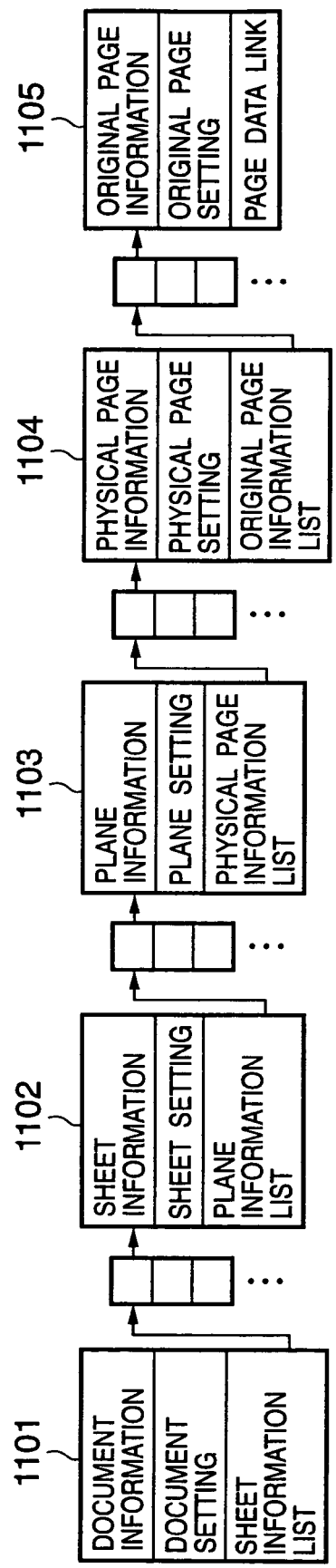
FIG. 12 is a view showing an example of a data structure used in printing or display.

FIG. 12 shows an example of the data structure of a job ticket. The structure in FIG. 12 is slightly different from the above-described structure in that no sheet bundle node exists, and a plane node is inserted instead immediately below a sheet node. In FIG. 12, a document to be printed is formed by a set of sheets, and each sheet is formed by two, upper and lower planes. Each plane has a region (physical page) for laying out an original, and each physical page is formed by a set of original pages serving as minimum units. Reference numeral 1101 denotes data corresponding to a document. The data 1101 is formed by data on a whole document and a list of sheet information constituting the document. Sheet information 1102 is formed by information on a sheet such as the sheet size, and a list of plane information laid out on the sheet. Plane information 1103 is formed by data unique to a plane, and a list of physical pages laid out on the plane. Physical page information 1104 is formed by information such as the size and header/footer of a physical page, and a list of original pages which form the physical page. The document information 1101, the sheet information 1102, the plane information 1103, the physical page information 1104, and original page information 1105 contain the above-described parameters.

<Document Structure Managed by Editing Information File>

The printing control application 104 is a program which provides a user interface for causing the user to designate data contained in a page-storing file by various methods and change printing settings. The page-storing file is a file having the above-described structure. The printing control application 104 manages the above-mentioned editing information file in correspondence with the page-storing file in order to manage the page-storing file. Based on editing information contained in the editing information file, the printing control application 104 manages a document with a management structure independent of a document defined by the page-storing file, e.g., a job ticket. The management structure is a hierarchical structure similar to the job ticket, but is formed by layers "book", "chapter", and "original (logical) page" from the top, unlike the job ticket. Of these layers, the original page corresponds to the original page of the job ticket. The chapter corresponds to the sheet bundle (set of sheets).

A virtual file displayed as a user interface is not a file which is page-storingly saved and managed, unlike the page-storing file 103, but is temporarily created for a user interface when the user changes the printing settings of the page-storing file or designates printing by using the printing control application 104. The printing control application 104 opens the page-storing file 103 together with a corresponding editing information file 111, creates a virtual book file having a structure defined by editing information from the page-storing file, and displays the book file as a user interface. When the user changes printing settings while referring to the book file via the user interface, the settings are reflected in the editing information file.

<Example of Format of Editing Information File>

Before referring to details of the printing control application 104, the data format of a book file, i.e., editing information file will be explained. The book file has a three-layered structure similar to a paper-medium book. The upper layer is called a "book", resembles one book, and defines the attributes of the entire book. The intermediate layer corresponds to a chapter in the book, and is also called a "chapter". As for each chapter, its attributes can be defined. The lower layer is a "page", and corresponds to each page defined by an application program. As for each page, its attributes can be defined. One book may include a plurality of chapters, and one chapter may include a plurality of original pages.

Figure 3:
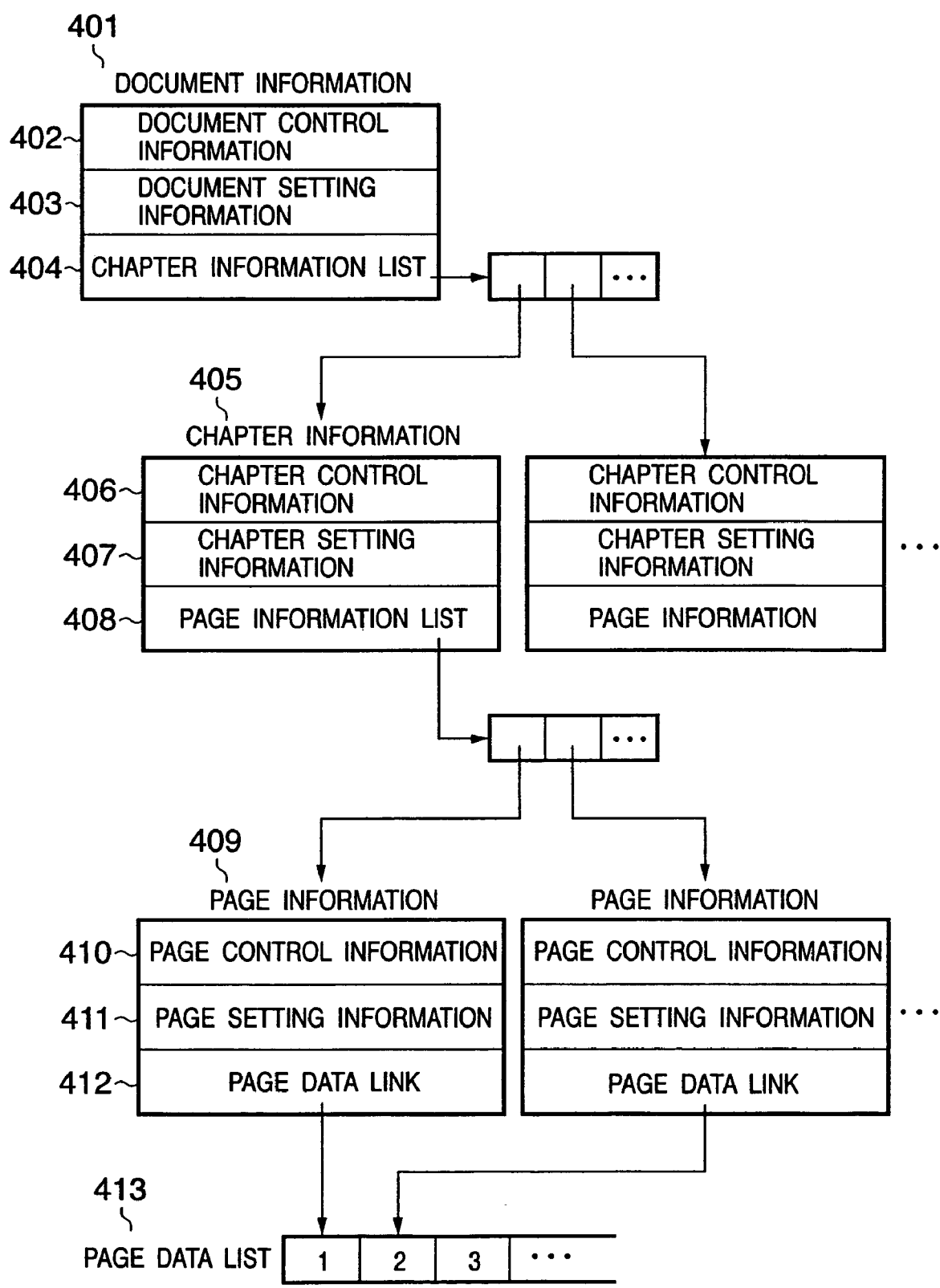
FIG. 3 is a view showing an example of a book file structure.

FIG. 3 is a block diagram schematically showing an example of the book file format. A book, chapter, and page in the book file of this example are represented by corresponding nodes. One book file includes one book. The book and chapter are a concept for defining a book structure, and contain, as entities, defined attribute values and links to lower layers. The page entity is original page data of the PDF format or the like which is contained in the page-storing file 103.

That is, the editing information file only defines the book file format and attributes, and does not contain original page data itself. The page has, as entities, data of each page output from an application program. The page includes an original page entity (original page data) and a link to each original page data in addition to an attribute value. Note that a printing page to be output to a paper medium may include a plurality of original pages. This structure is displayed not by a link, but by attributes in book, chapter, and page layers.

In FIG. 3, a book file need not be one completed book, and "book" is generalized as "document". Information on a document, information on a chapter, and information on a page will be comprehensively called document information, chapter information, and page information, respectively.

In FIG. 3, document information 401 is defined at the top. The document information 401 can be roughly divided into three parts 402 to 404. The document control information 402 holds information such as the path name in the file system of a document file. The document setting information 403 holds layout information such as the page layout, and function setting information of a printing apparatus such as stapling, and corresponds to book attributes. The chapter information list 404 holds as a list a set of chapters which form a document. The list holds chapter information 405.

The chapter information 405 can also be roughly divided into three parts 406 to 408. The chapter control information 406 holds information such as the chapter name. The chapter setting information 407 holds information on the page layout and stapling unique to the chapter, and corresponds to chapter attributes. By holding setting information for each chapter, a document having a complicated layout can be created such that the first chapter has a 2-up layout and the remaining chapters have a 4-up layout. The page information list 408 holds as a list a set of original pages which form each chapter. The page information list 408 designates page information data 409.

The page information data 409 can also be roughly divided into three parts 410 to 412. The page control information 410 holds information such as a page number displayed at the tree. The page setting information 411 holds information such as the page rotation angle and page layout position information, and corresponds to original page attributes. The page link information 412 is original data corresponding to a page. In this example, the page information 409 does not directly have original data, but has only the link information 412. Actual original data is held by a page data list 413.

FIGS. 4A and 4B show a list representing an example of book attributes (document setting information 403). In general, as for an item which can be defined repetitively on a lower layer, the attribute value of the lower layer is preferentially adopted. As for an item contained in only the book attribute, a value defined in the book attribute is effective over the book. An item repetitively defined on a lower layer is a default value used when this item is not defined in the lower layer. In this example, however, whether to preferentially adopt the attribute value of a lower layer can be selected, which will be described later. Each item shown in FIGS. 4A and 4B does not correspond to one concrete item, but may contain a plurality of relevant items.

Items unique to book attributes are six items: printing method, details of bookbinding, front/back cover, index sheet, slip sheet, and chaptering. These items are defined over the book. As printing method attributes, three values: single-sided printing, double-sided printing, and bookbinding printing can be designated. Bookbinding printing is a method of printing data in a format which allows bookbinding by bundling a separately designated number of paper sheets, folding the bundle into two, and binding the bundle. As detailed bookbinding attributes, the opening direction and the number of paper sheets to be bundled can be designated when bookbinding printing is designated.

The front/back cover attribute includes designation of adding paper sheets serving as front and back covers when a page-storing file combined as a book is printed, and designation of contents to be printed on the added paper sheets. The index sheet attribute includes designation of inserting a tabbed index sheet separately prepared in a printing apparatus for chaptering, and designation of contents to be printed on the index (tabbed) portion. This attribute becomes effective when a printing apparatus to be used is equipped with an inserter having an inserting function of inserting a paper sheet prepared separately from a printing sheet into a desired position, or when a plurality of sheet cassettes can be used. This also applies to the slip sheet attribute.

The slip sheet attribute includes designation of inserting a paper sheet fed from an inserter or sheet feed cassette for chaptering, and designation of a sheet feed source when a slip sheet is inserted.

The chaptering attribute includes designation of whether to use a new paper sheet, use a new printing page, or do nothing particular at a chapter break. In single-sided printing, the use of a new paper sheet and the use of a new printing page are the same. In double-sided printing, a continuous chapter is not printed on one paper sheet if "the use of a new paper sheet" is designated, but may be printed on the obverse and reverse of one paper sheet if "the use of a new printing page" is designated.

FIG. 5 shows a list representing an example of chapter attributes (chapter setting information 407), and FIG. 6 shows a list representing an example of page attributes (page setting information 411). The relationship between chapter attributes and page attributes is the same as that between book attributes and lower layer attributes.

As for the chapter attribute, there is no item unique to the chapter, and all items overlap those of the book attribute. In general, if the definition of the chapter attribute is different from that of the book attribute, a value defined by the chapter attribute precedes. In this example, however, whether to preferentially adopt the attribute value of a lower layer can be selected, which will be described later.

Items common to only the book and chapter attributes are five items: paper size, paper direction, N-up printing designation, enlargement/reduction, and delivery method. The N-up printing designation attribute is an item for designating the number of original pages included in one printing page. Layouts which can be designated are 1×1, 1×2, 2×2, 3×3, 4×4, and the like. The delivery method attribute is an item for designating whether to staple discharged paper sheets. The effectiveness of this attribute depends on whether the printing apparatus has a stapling function.

Items unique to the page attribute are a page rotation attribute, zoom, layout designation, annotation, and page division. The page rotation attribute is an item for designating the rotation angle when an original page is laid out on a printing page. The zoom attribute is an item for designating the zoom ratio of an original page. The zoom ratio is designated based on a virtual logical page region size=100%. The virtual logical page region is a region occupied by one original page when original pages are laid out in accordance with N-up designation or the like. For example, the virtual logical page region is a region corresponding to one printing page for 1×1, and a region obtained by reducing each side of one printing page to about 70% for 1×2.

Attributes common to the book, chapter, and page are a watermark attribute and header/footer attribute. The watermark is a separately designated image or character string printed over data created by an application. The header and footer are watermarks printed at the upper and lower margins of each page. For the header and footer, items such as a page number, and time and date which can be designated by variables are prepared. Contents which can be designated by the watermark attribute and header/footer attribute are common to the chapter and page, but are different from those of the book. The book can set the contents of the watermark and header/footer, and designate how to print a watermark or header/footer throughout the book. To the contrary, the chapter and page can designate whether to print a watermark or header/footer set by the book on the chapter or page.

<Example of Operation Sequence of Document Processing System According to Embodiment>

Figure 7:
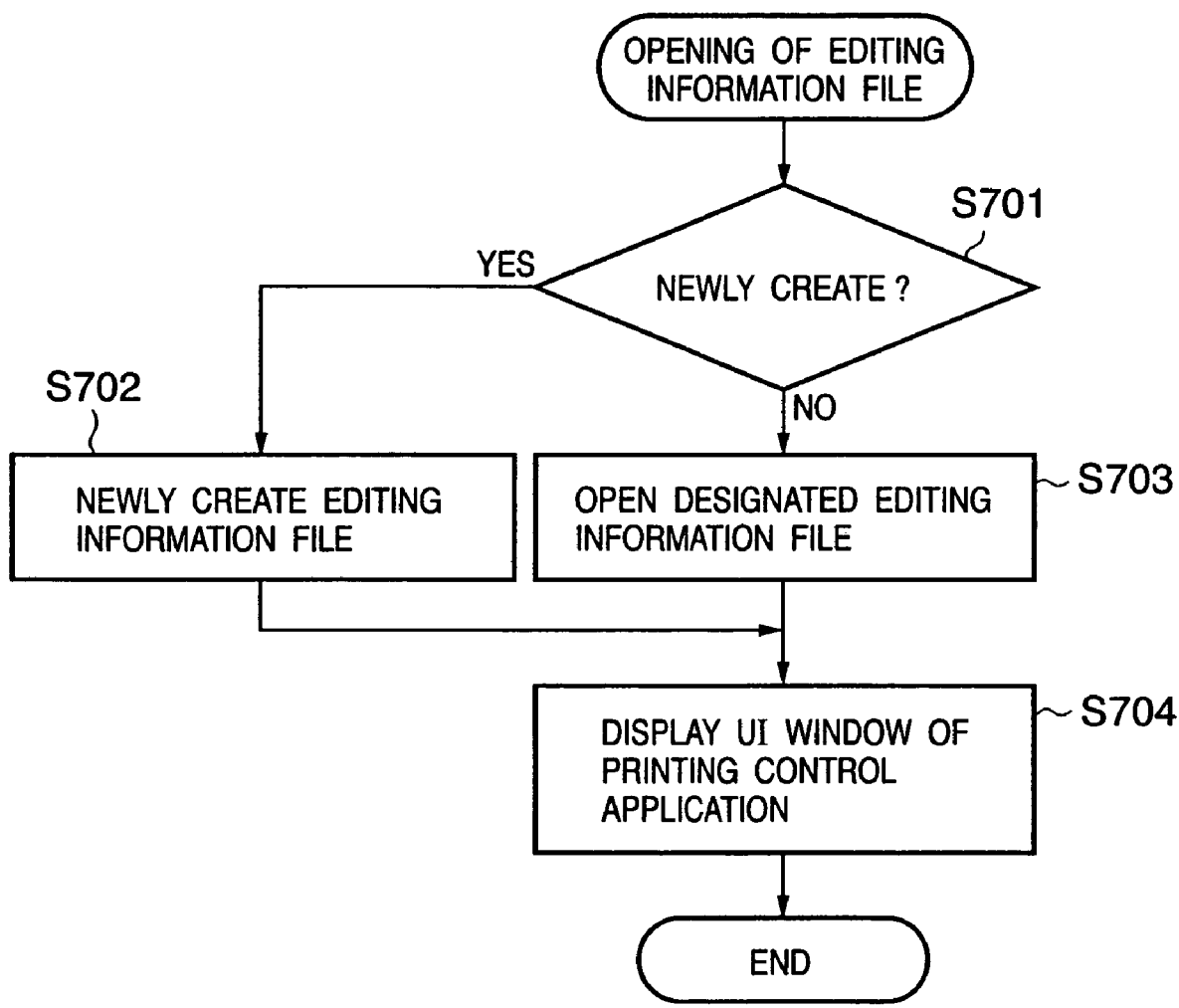
FIG. 7 is a flow chart showing an example of a sequence of opening a book file.

The editing information file has the above-described structure and contents. A sequence of creating the editing information file 111 and page-storing file 103 by the printing control application 104 and printing data save driver 102 will be explained. Creation of the editing information file 111 is realized as part of editing operation of the editing information file 111 by the printing control application 104. FIG. 7 shows a sequence when the printing control application 104 opens the editing information file 111.

Figure 8:
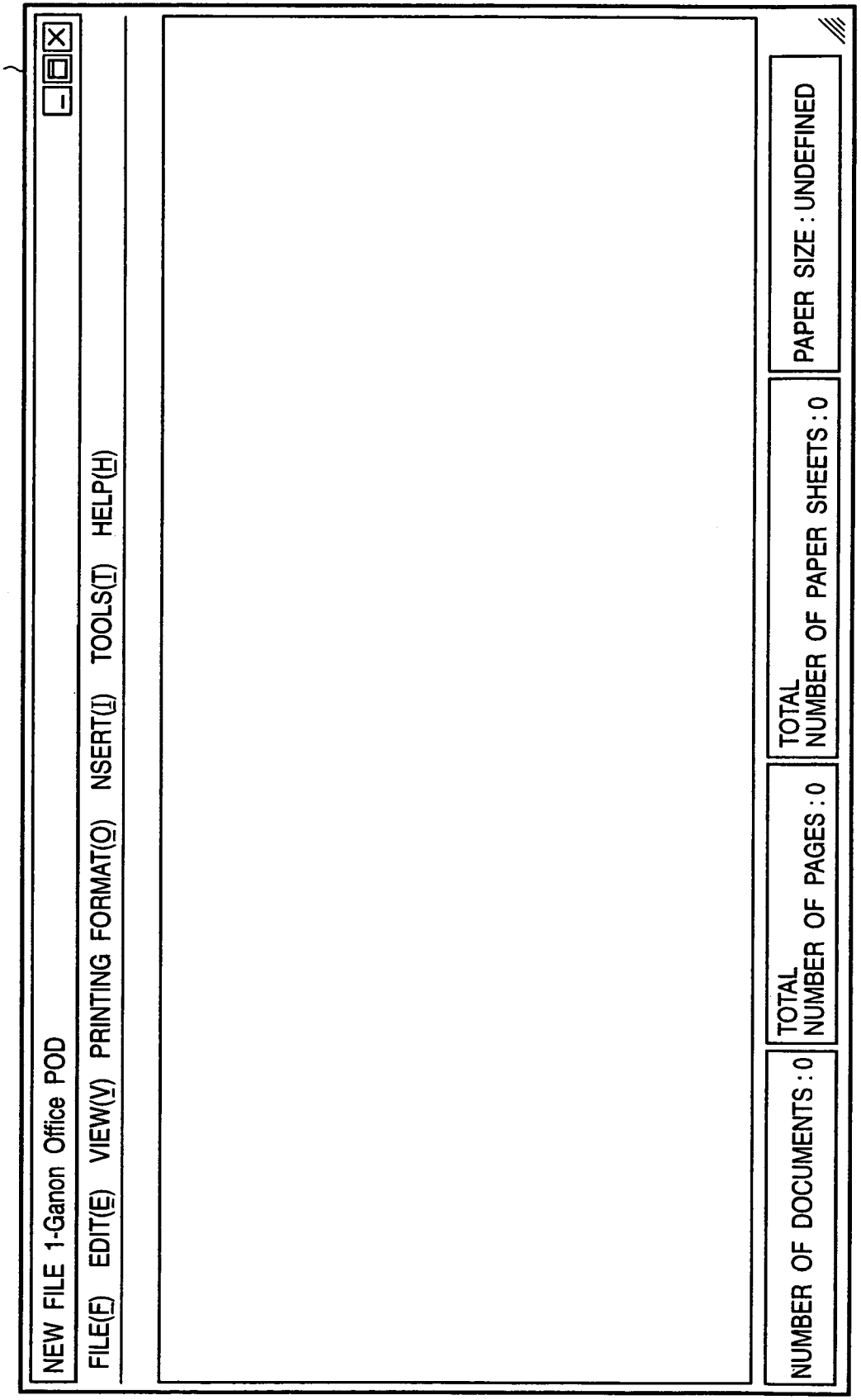
FIG. 8 is a view showing an example of a user interface window when a new book file is opened.

Whether an editing information file to be opened is one to be newly created or an existing one is determined (step S701). If YES in step S701, an editing information file including no chapter is newly created (step S702). In the example shown in FIG. 3, the newly created editing information file is a book node having no chapter node linked to the chapter information list 404. As the book attribute, a set of attributes prepared in advance for creation of a new editing information file are applied. A UI (User Interface) window for editing the new editing information file is displayed (step S704). FIG. 8 shows an example of a UI window when a book file is newly created. In this case, the book file does not have any substantial content, and a UI window 800 does not display anything.

Figure 9:
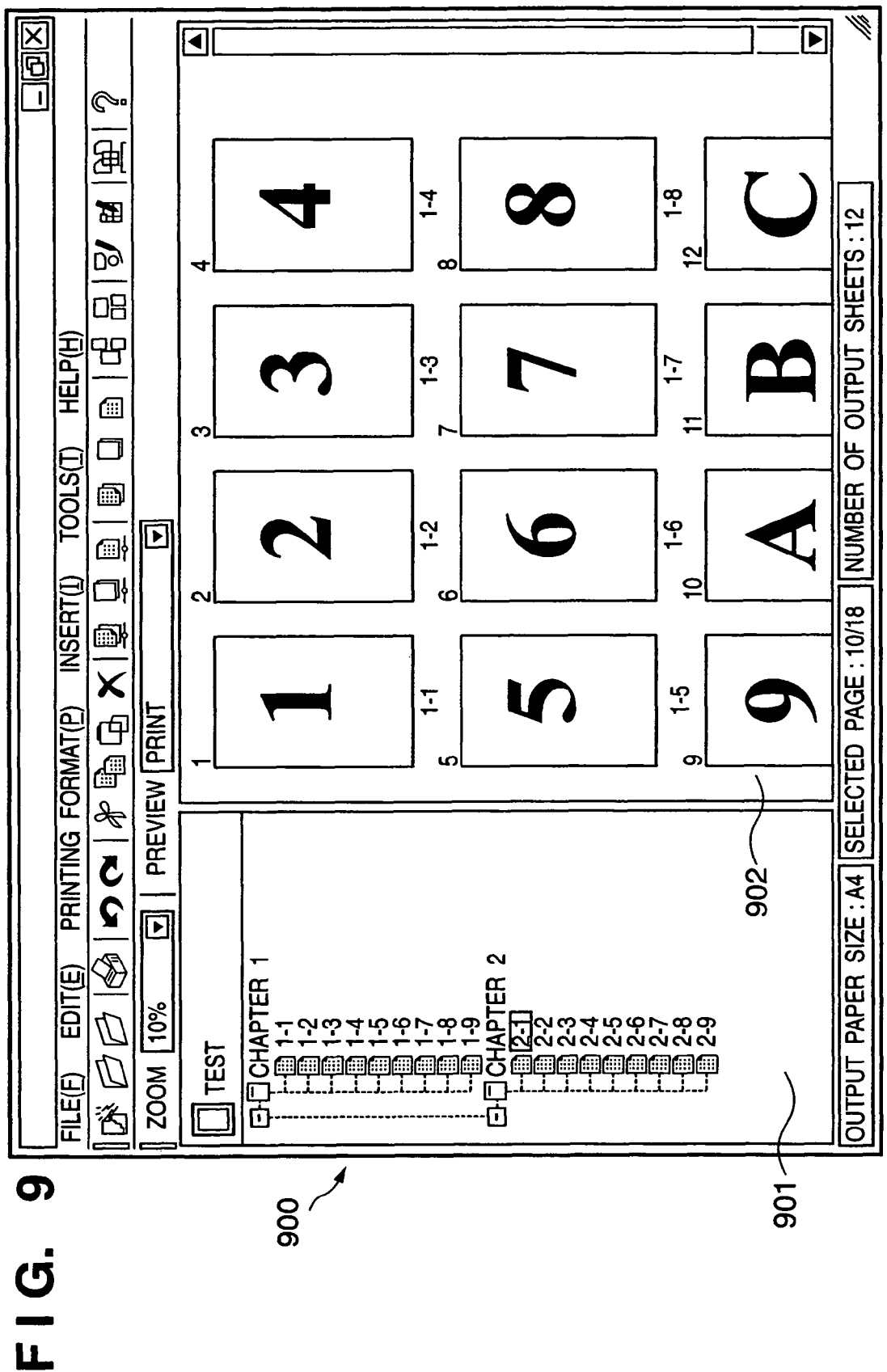
FIG. 9 is a view showing an example of a user interface window when an existing book file is opened.

If NO in step S701, a designated editing information file is opened (step S704), and data are rasterized in accordance with the structure, attributes, and contents of the editing information file to display a UI (User Interface) window. FIG. 9 shows an example of the UI window. A UI window 900 has a tree portion 901 representing a book structure, and a preview portion 902 displaying a state to be printed. The tree portion 901 displays chapters included in the book and pages included in each chapter by a tree structure so as to exhibit a tree structure as shown in FIG. 3. Pages displayed at the tree portion 901 are original pages. The preview portion 902 displays reduced printing page contents. The display order reflects the book structure. Data mapped in the RAM 102 also takes the same structure as that in FIG. 3. Attributes included in the node of each layer are also mapped in the RAM 102 in the format shown in FIGS. 4A to 6. For example, the structure of these attribute items can be realized with a pointer or the like, and each item at the attribute can be identified by the identifier of the item or the like.

Figure 10:
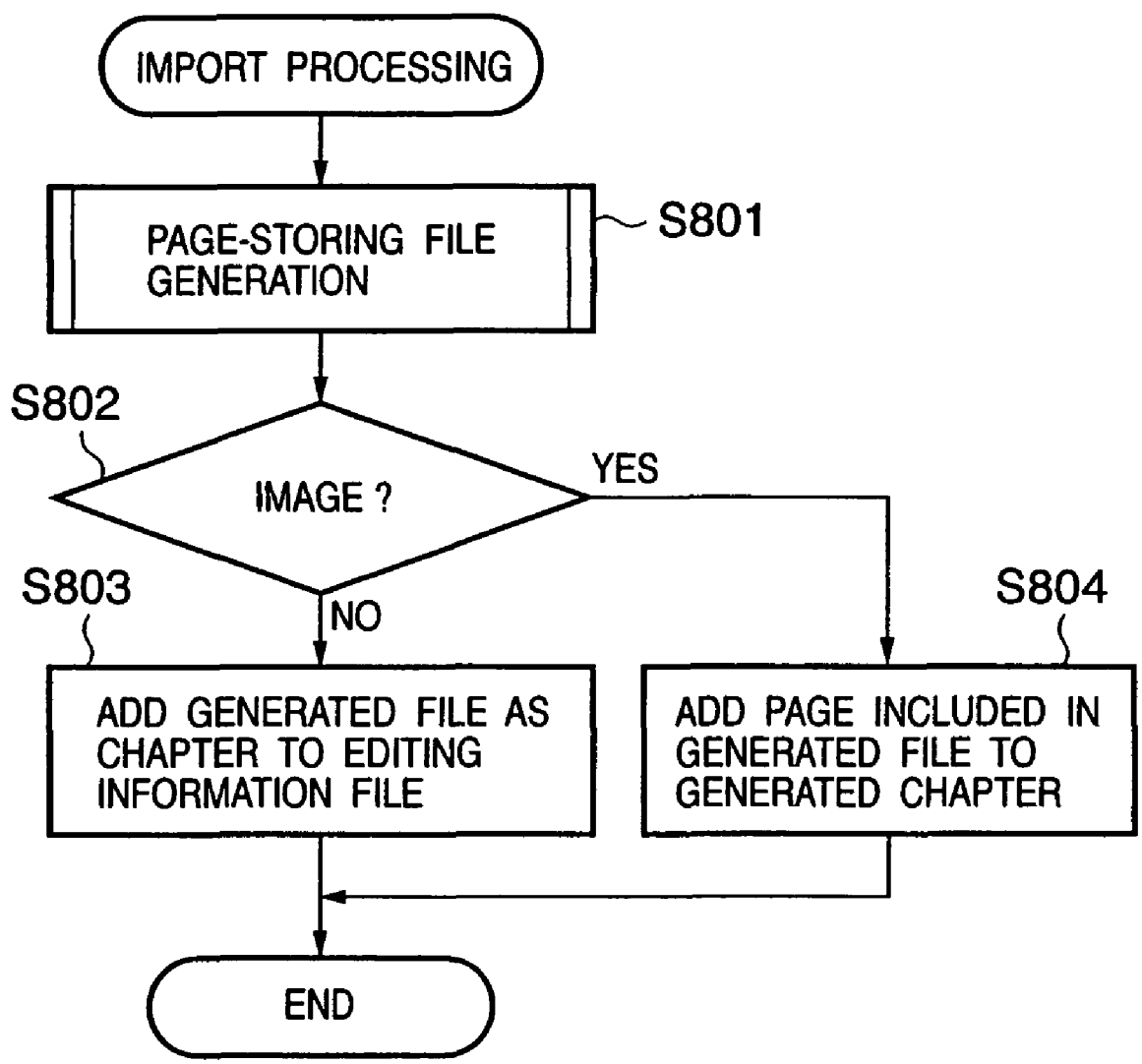
FIG. 10 is a flow chart showing an example of a sequence of importing a page-storing file to a book file.

Original page data can be added as a new chapter to the open editing information file by the printing data save driver 102. This function is called an import function. Application data is imported to the editing information file newly created by the sequence of FIG. 7, and the original page data is made to belong to the chapter of the editing information file, thereby giving an entity to the editing information file. This function is activated by drag-and-drop operation of application data to the window of FIG. 8. FIG. 10 shows an import processing sequence.

In FIG. 10, an application program which has generated designated application data is activated. The printing data save driver 102 is designated as a device driver, and application data is printed out to convert the data into data of an intermediate format (e.g., PDF format) (step S801). After conversion, whether the converted data is image data is determined (step S802). This determination can be done on the basis of the file extension of application data under the Windows® OS. For example, an extension "bmp" represents Windows® bitmap data; "jpg", jpeg-compressed image data; and "tiff", tiff-format image data.

If NO in step S802, the intermediate data generated in step S801 is added as a new chapter to the book of a currently open editing information file (step S803). That is, a new chapter and new original pages belonging to this chapter are added by import. Link information to the entity of an original page is written at each page node. The entity of the original page is generated by the printing data save driver 102.

In import, as for chapter attributes which are common to book attributes, the values of the book attributes are copied. As for unique chapter attributes, predetermined values are set.

If YES in step S802, no new chapter is added in principle, and image data is added to a designated chapter by using one file as one original page (step S804). For an empty file in which an editing information file is newly created, a new chapter is created, and image data is added as an original page belonging to the chapter. As for the page attribute, attributes common to the attributes of an upper layer are given the attribute values of the upper layer, and attributes which are defined in application data and inherited to the page-storing file are given values defined in the application data. For example, when N-up designation is defined in application data, the page inherits this attribute value. In this way, a new editing information file is created, or a new chapter is added.

As for a page-storing file, added original page data is newly added and saved if data generated by the printing data save driver is an addition to an existing page-storing file. At this time, if printing settings designated by an application are reflected in data generated by the printing data save driver, the printing settings can also be reflected in the page-storing file.

Figure 11:
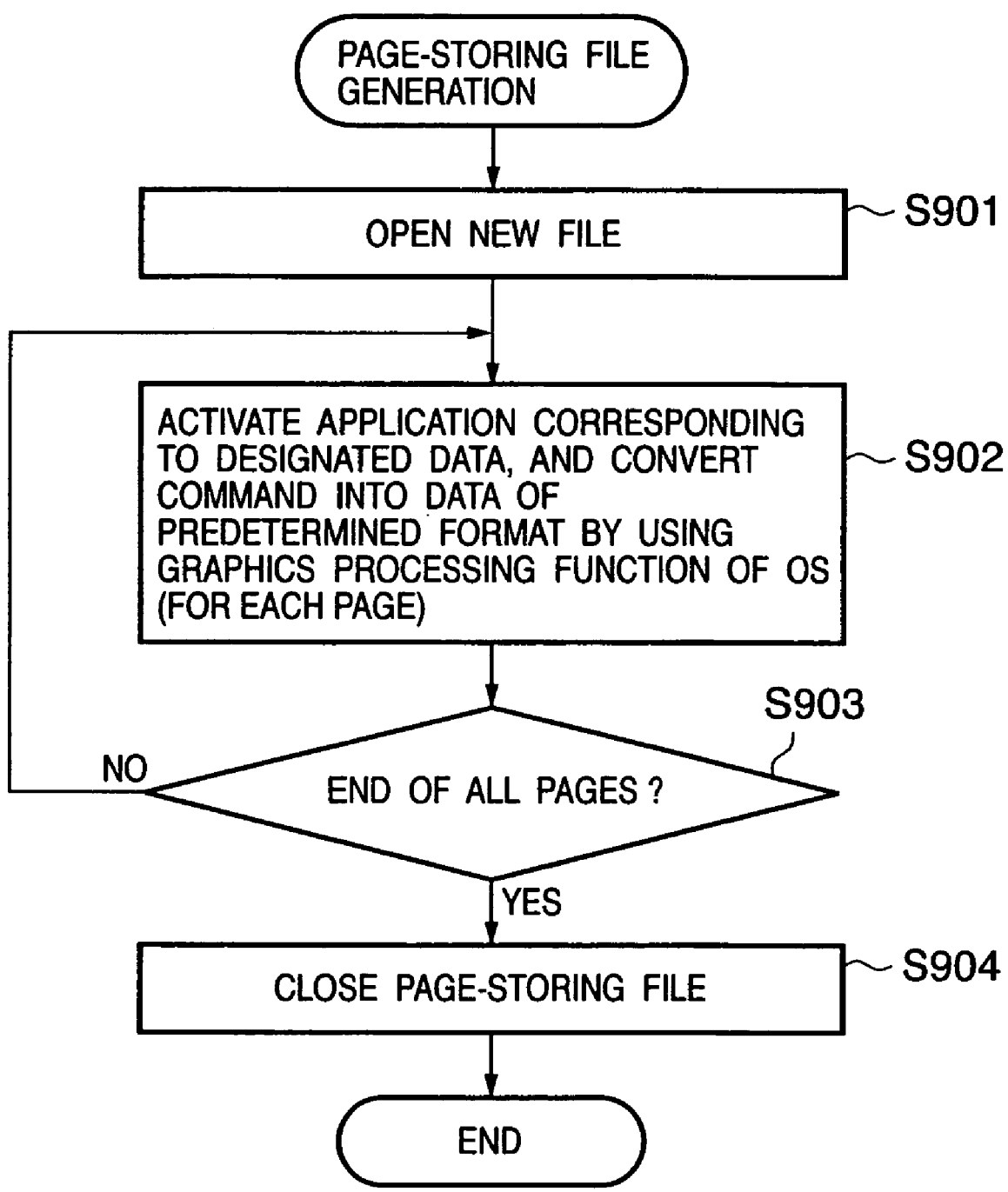
FIG. 11 is a flow chart showing an example of a sequence of converting application data in step 801 of FIG. 10 into a page-storing file.

FIG. 11 is a flow chart showing a sequence of generating a page-storing file by the printing data save driver 102 in step S801 of FIG. 10. A new page-storing file is created and opened (step S901). An application corresponding to designated application data is activated. The printing data save driver 102 is set as a device driver to transmit an output command to an OS output module (e.g., Windows® GDI). The output module converts the received output command into data of a predetermined format (e.g., PDF format) by the printing data save driver 102, and outputs the converted data (step S902). The output destination is the page-storing file opened in step S901. Whether all designated data have been converted is determined (step S903), and if YES in step S903, the page-storing file is closed (step S904). The page-storing file generated by the printing data save driver 102 is a file which contains a structure shown in FIG. 12 and original page data entities.

<Editing of Permanent File and Editing Information File>

In the above fashion, the editing information file 111 and page-storing file 103 can be created from application data. As for the generated page-storing file 103, chapters and pages defined by the editing information file ill can be edited as follows.

(1) New document
(2) Delete
(3) Copy
(4) Cut
(5) Paste
(6) Move
(7) Change chapter name
(8) Reassign page number/name
(9) Insert cover
(10) Insert slip sheet
(11) Insert index sheet
(12) Page layout of each original page In addition, an operation of canceling executed editing operation, and an operation of restoring canceled operation can be performed. These editing functions enable editing operations such as consolidation of a plurality of editing information files, rearrangement of chapters and pages within an editing information file, delete of chapters and pages within an editing information file, layout change of an original page, and insertion of a slip sheet and index sheet. By these operations, operation results are reflected in attributes shown in FIGS. 4 to 6 or on an editing information file structure. For example, a blank page is inserted into a designated portion by an operation of newly adding a blank page. The blank page is processed as an original page. If the layout of an original page is changed, the change contents are reflected in attributes such as the printing method, N-up printing, front/back cover, index sheet, slip sheet, and chaptering.

These editing contents are also reflected in the page-storing file. For example, if double-sided printing is set as a printing method for a whole document, the setting is reflected as the book attribute of the editing information file and also as setting data of the whole document in printing setting data of the page-storing file.

<Output of Permanent File>

The ultimate goal of an editing information file created and edited in the above manner is to print it out. If the user selects a file menu from the UI window 900 of the printing control application shown in FIG. 9 and selects printing from this menu, the editing information file is then printed out by a designated output device. At this time, the printing control application 104 creates data called a despool table from a currently open editing information file and corresponding page-storing file (e.g., job ticket), and transfers the despool table to the printing application 105.

The despool table contains the same structure as that of the original job ticket, printing settings in respective layers, and association with original pages. More specifically, printing settings such as the number of copies, color type, and double-sided/single-sided printing designation which are effective for a whole document are accompanied by printing settings such as N-up printing designation which are effective for a sheet bundle (set of sheets). Each sheet belonging to each sheet bundle has printing settings such as double-sided/single-sided printing. Each physical page (plane) belonging to each sheet has printing settings such as the color type and designation of an upper/lower plane. The printing settings of each layer include settable items. Settings in the despool table are designated on physical pages in accordance with the device specifications. The printing application 105 converts the despool table into a parameter to be transferred to the graphic engine 121.

The printing application 105 converts the page-storing file 103 into an OS output command, e.g., a Windows® GDI command, and calls a GDI function serving as a graphic engine by using the command as a parameter. The graphic engine 121 generates a command complying with a device (e.g., printer) by the designated printer driver 121, and transmits the command to the device.

The graphic engine 121 loads the printer driver 106 prepared for each printing device from the external memory 211 to the RAM 202, and sets the output to the printer driver 106. The graphic engine 121 converts a GDI (Graphic Device Interface) function into a DDI (Device Driver Interface) function, and calls a DDI function provided by the printer driver 106. The printer driver 106 converts the command into a control command such as a PDL (Page Description Language) command recognizable by the printer on the basis of the DDI function called from the output module. The converted printer control command passes through the system spooler 122 loaded by the OS to the RAM 202, and is output as printing data to the printer 107 via the interface 21

(Example of Preview Display Contents)

As described above, when a book file is opened by the printing control application, the user interface window 900 shown in FIG. 9 is displayed. The tree portion 901 displays a tree representing the structure of the open book (to be referred to as a "book of interest" hereinafter). At the preview portion, three display methods are prepared in accordance with designation by the user. The first method is a mode called an original view which directly displays original pages. In the original view mode, the contents of original pages belonging to the book of interest are reduced and displayed. The display of the preview portion does not reflect any layout. The second method is a printing view mode. In the printing view mode, the preview portion 902 displays original pages in a format which reflects the layout of them. The third method is a simple printing view mode. In the simple printing view mode, the contents of original pages are not reflected in the display of the preview portion, but only the layout is reflected. <Another Example of Configuration of Document Processing System>

The document processing system according to the embodiment is of a stand-alone type. A server-client system as an extension of the stand-alone system also creates and edits a book file by almost the same configuration and sequence. A book file and printing processing are managed by the server.

Figure 13:
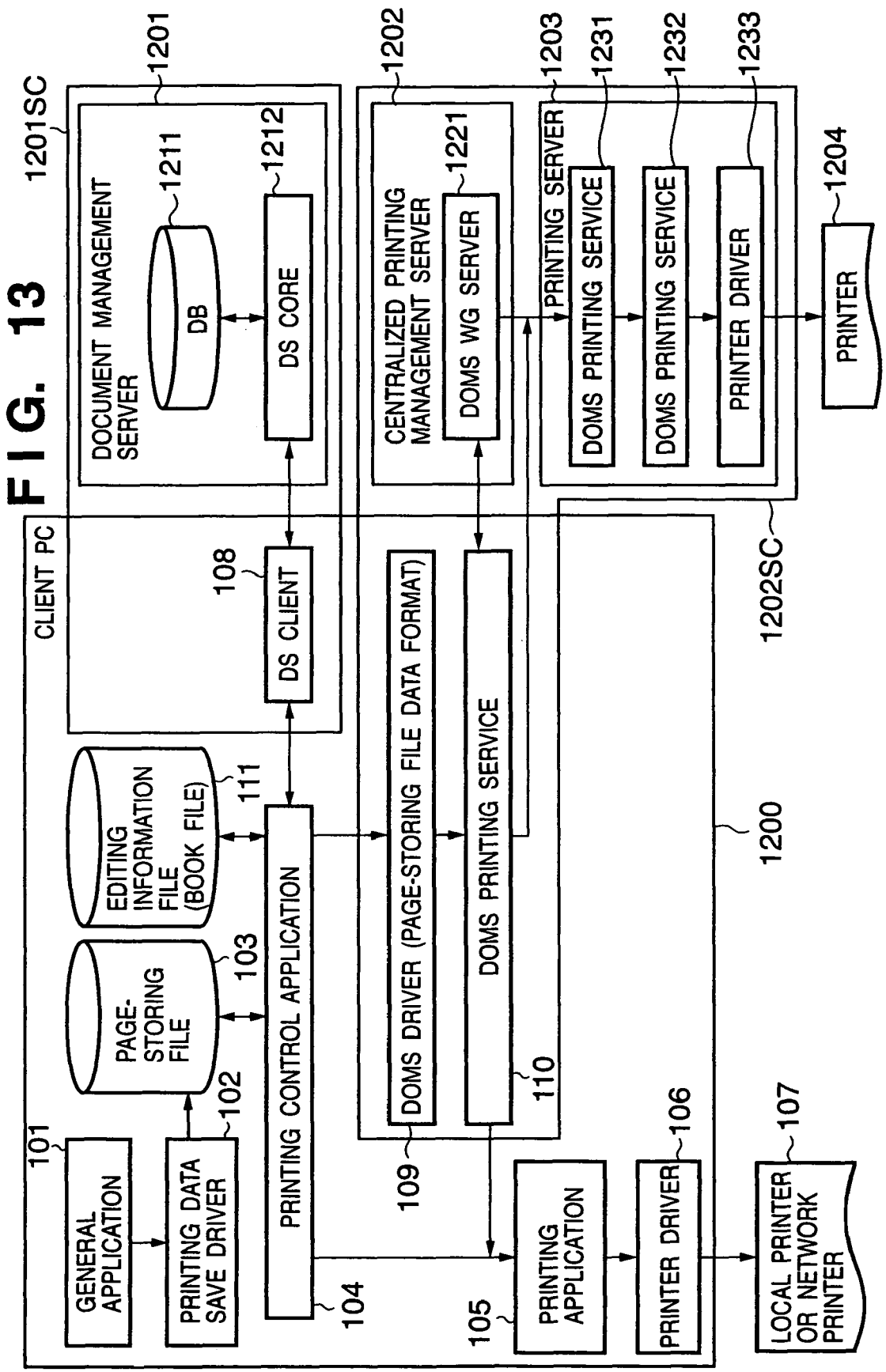
FIG. 13 is a block diagram showing an example of the software configuration of a client-server document processing system.

FIG. 13 is a block diagram showing the configuration of a server-client document processing system.

The client document processing system is constituted by adding to the stand-alone system a DOMS (Document Output Management Service) driver 109 serving as a client module, a DOMS printing service module 110, and a DS (Document Service) client module 108. A client document processing system 1200 is connected to a document management server 1201, centralized printing management server 1202, and printing server 1203. These servers are generally connected to the client document processing system via a network. When the servers also function as clients, they are connected by interprocess communication which simulates communication between networks. The document management server 1201 and centralized printing management server 1202 are connected to the client in FIG. 13, but only either one may exist on the network. If the connected server is the document management server, a document management server-client system 1201SC including a client module is added to the stand-alone document management system. If the connected server is the centralized printing management server 1202, a printing management server-client system 1202SC including a client module is added.

The document management server 1201 stores a book file created and edited by the printing control application 104. To manage a book file by the document management server 1201, the book file is saved in a database 1211 of the document management server 1201 instead of or in addition to the local HD of a client PC. Save and read of a book file between the printing control application 104 and the document management server 1201 are done via the DS client module 108 and a DS core 1212.

The centralized printing management server 1202 manages printing of a book file stored in the client document processing system 1200 or document management server 1201. A printing request from the client is transmitted to a DOMS WG server module 1221 of the centralized printing management server 1202 via the DOMS driver 109 and DOMS printing service module 110. To print a book file by the printer of the client, the centralized printing management server 1202 transfers electronic original data to the printing application 105 via the DOMS printing service module 110 of the client. To print a book file by the printing server 1203, the centralized printing management server 1202 transmits electronic original data to a DOMS printing service module 1231 of the printing server 1203. For example, the centralized printing management server executes security check on the qualification of a user who has issued a printing request for a saved book file, or saves the printing processing log. In this fashion, the document processing system can be implemented as both a stand-alone system and client-server system.

[Example of Editing Operation of Document Processing System According to Embodiment]

FIG. 9 shows the operation window of the printing control application 104. The printing control application can set the function of a printing apparatus such as stapling, in addition to editing such as a change of the page order of a document, copying, and delete. The printing control application can cause a designated printing apparatus to print. A tree view representing a document structure is displayed in the left region of FIG. 9. A document is formed by a set of chapters, and each chapter is formed by a set of original pages. The printing preview of each page is displayed in the right region of FIG. 9.

<Example of Attribute Setting of Document Processing System According to Embodiment>

Figure 14:
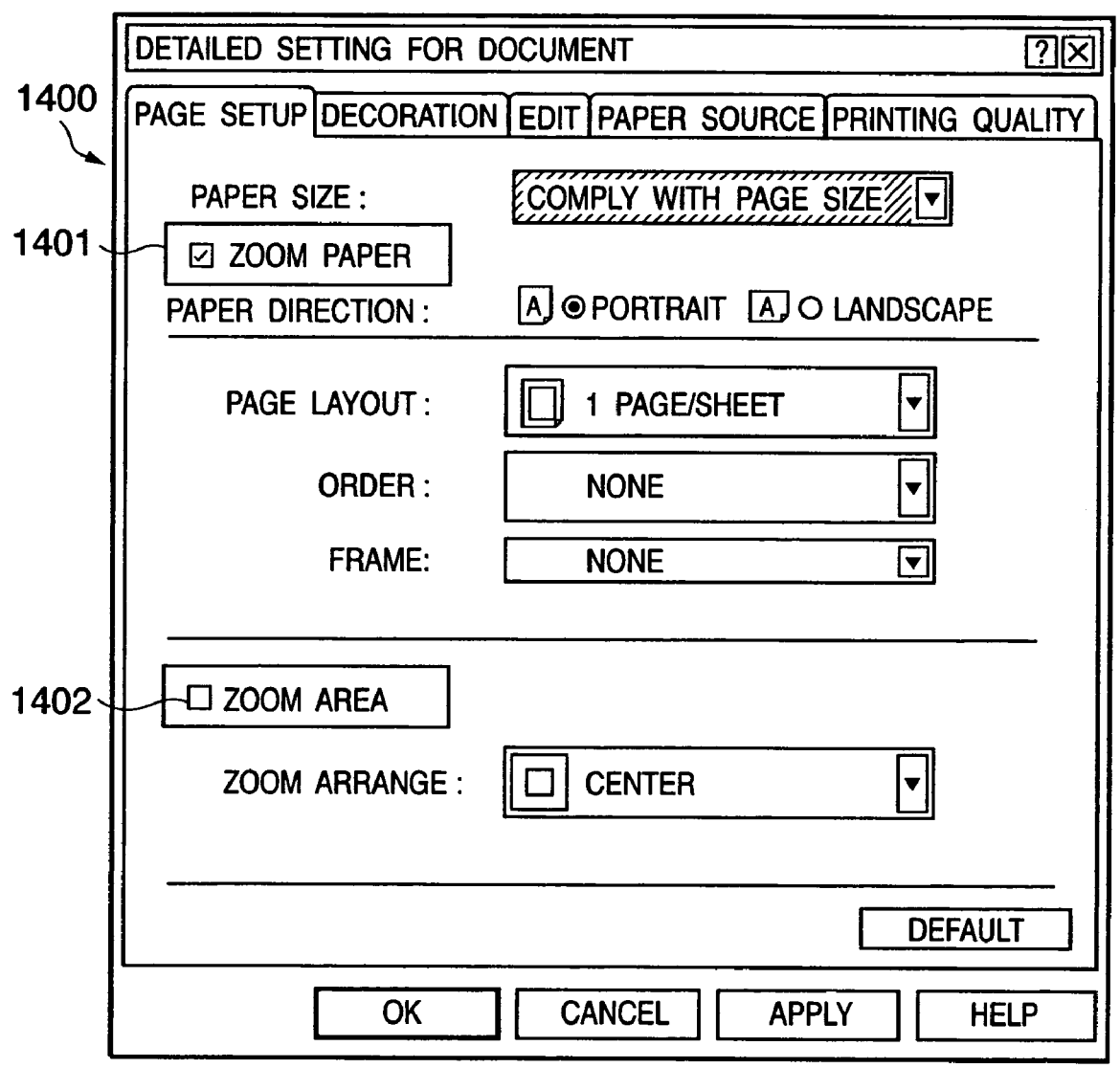
FIG. 14 is a view showing an example of a dialog window for setting a whole document serving as the uppermost layer of a data structure.

FIG. 14 shows a "detailed setting for document" window 1400 of the printing control application 104.

This window allows displaying/setting the "document setting information 403". This window is activated from the "detailed setting for document" item of a "printing format" menu on the application operation window of FIG. 9 or a "detailed setting for document" button on the tool bar. The "detailed setting for document" window 1400 is a window for setting attributes which influence a whole document, i.e., book attributes shown in FIGS. 4A and 4B. This window is formed by five sheets "page setup", "decoration", "edit", "paper source", and "printing quality". FIG. 14 shows a state in which the "page setup" sheet is displayed. In the "page setup" sheet, settings mainly concerning the layout can be done. Settings such as the paper size, direction, and N-page printing can be designated. This window has check box controls 1401 and 1402 for the zoom.

Figure 15:
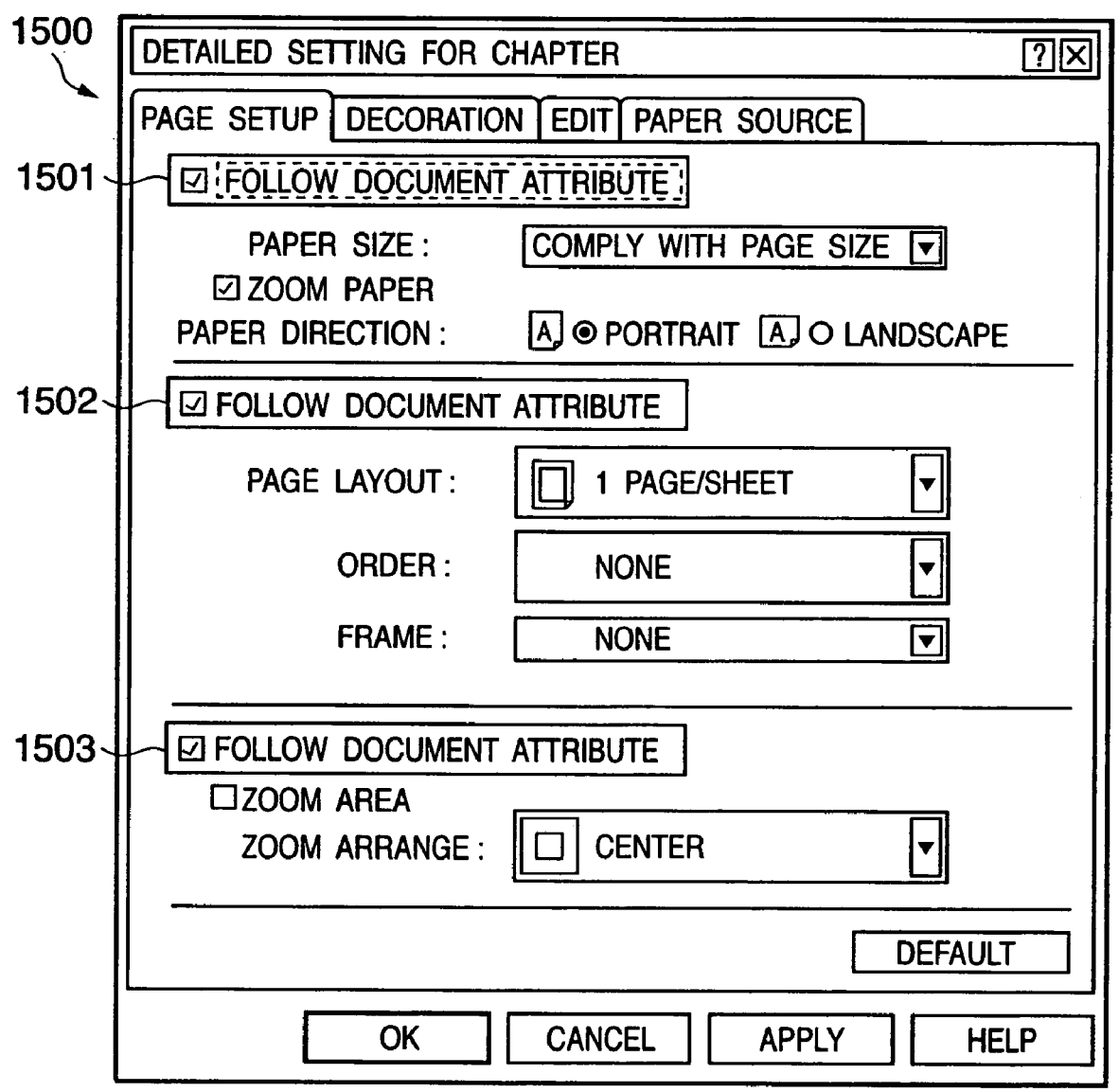
FIG. 15 is a view showing an example of a dialog window for setting a chapter serving as the intermediate layer of the data structure.

FIG. 15 shows a "detailed setting for chapter" window 1500 of the printing control application 104.

Figure 16:
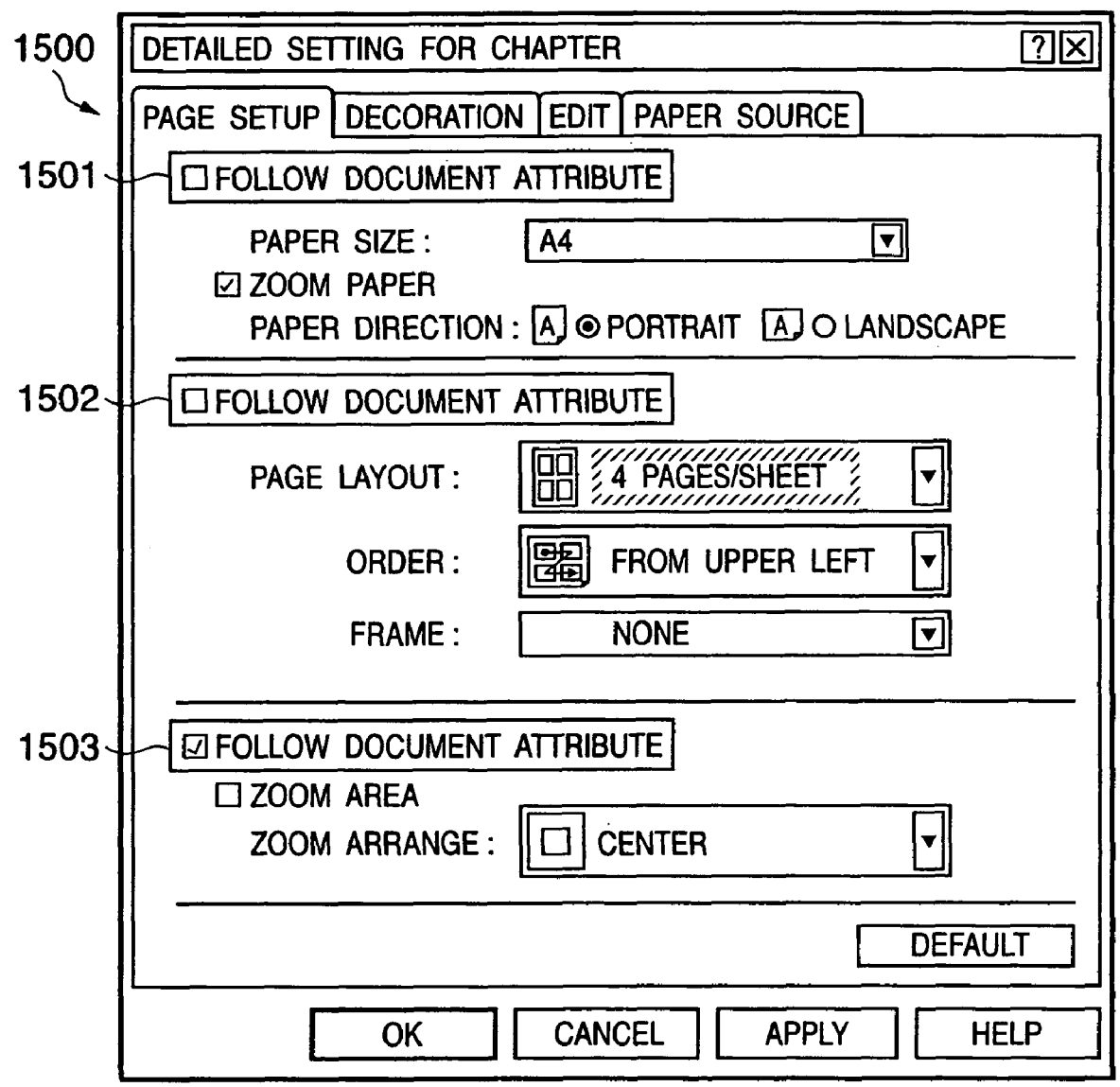
FIG. 16 is a view showing an example of setting a unique attribute in the dialog window of FIG. 15.

This window allows displaying/setting the "chapter setting information 407". This window is activated from the "detailed setting for chapter" menu of a printing setting menu on the application operation window of FIG. 9 or a "detailed setting for chapter" button on the tool bar. The "detailed setting for chapter" window is a window for setting attributes unique to a chapter. This window is formed by four sheets "page setup", "decoration", "edit", and "paper source". FIG. 15 shows a state in which the page setup sheet is displayed. In the page setup sheet, settings mainly concerning a layout unique to each chapter can be done. Settings such as the paper size, direction, and N-page printing can be designated. "Follow book attribute" check box controls 1501, 1502, and 1503 are arranged for repetitive setting items between "detailed setting for document" and "detailed setting for chapter". For an item group whose check box is checked, the setting values of the document are applied to the chapter. FIG. 16 shows a case wherein the check box is not checked. Settings unique to a chapter can be classified into two types: setting items held by only a chapter, and setting items whose setting values different from those of the document in the upper layer are held in the chapter layer.

FIG. 16 shows a state in which the check box controls 1501 and 1502 of "detailed setting for chapter" in FIG. 15 are not checked. In this case, even if the whole document uses A3 paper, pages which constitute this chapter use A4 paper. As for the layout, even if the document designates one page/sheet, the chapter designates a layout of four pages/sheet. "Zoom arrange" is checked, and the setting values of the document in the upper layer are employed as those of the chapter.

Figure 17:
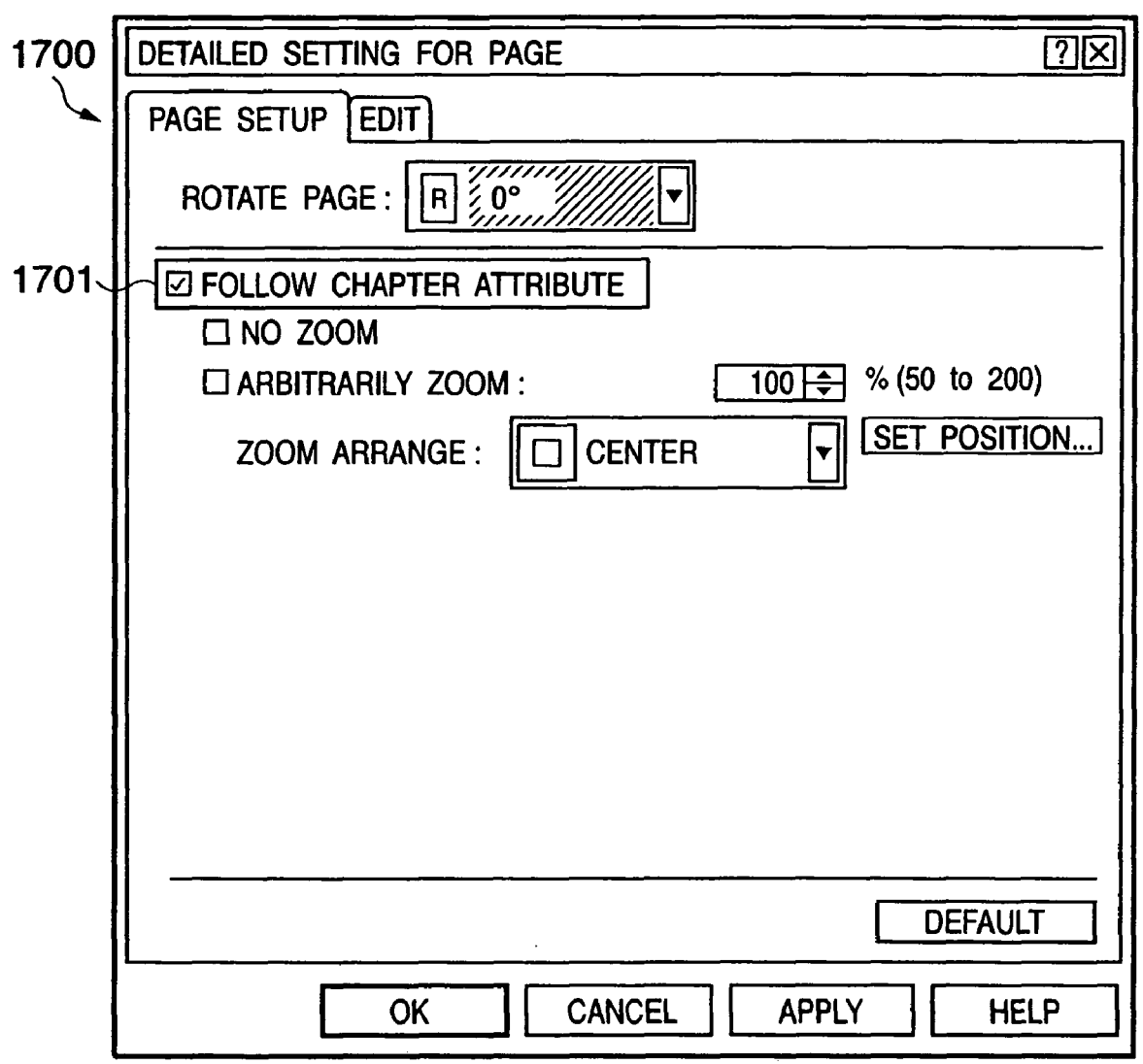
FIG. 17 is a view showing an example of a dialog window for setting a page serving as the lowermost layer of the data structure.

FIG. 17 shows a "detailed setting for page" window 1700 of the printing control application 104.

Figure 18:
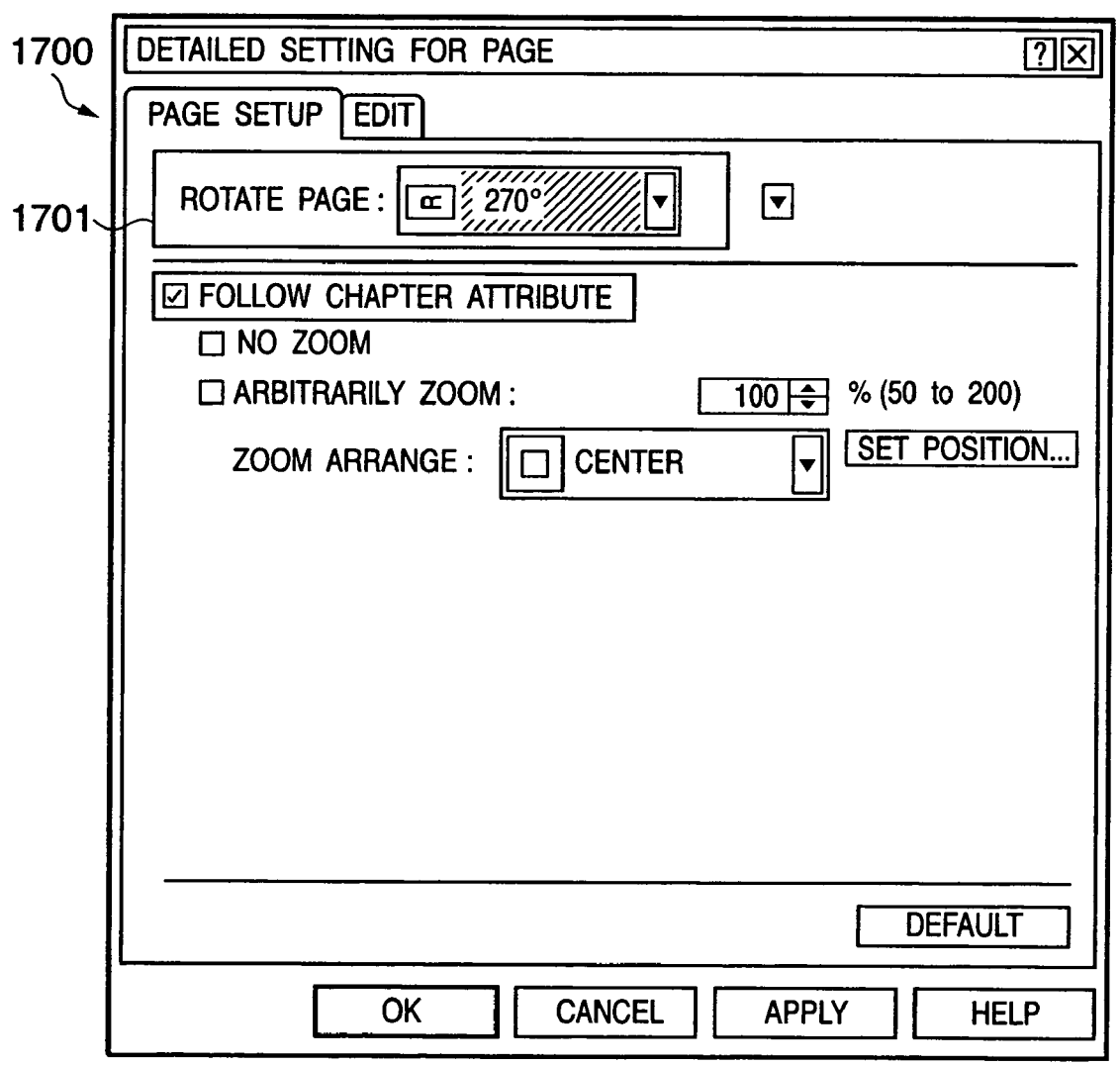
FIG. 18 is a view showing an example of changing a setting value in the dialog window of FIG. 17.

This window allows displaying/setting the "page setting information 411". This window is activated from the "detailed setting for page" menu of the printing format menu on the application operation window of FIG. 9 or a "detailed setting for page" button on the tool bar. The "detailed setting for page" window is a window for setting attributes unique to each page. This window is formed by two sheets "page setup" and "edit". FIG. 17 shows a state in which the page setup sheet is displayed. In the page setup sheet, settings mainly concerning a layout unique to each page can be done, and settings such as the rotation angle and enlargement/reduction ratio in laying out an original page can be designated. A "follow chapter attribute" check box control 1701 is arranged for repetitive setting items between "detailed setting for chapter" and "detailed setting for page". For an item whose check box is checked, the setting value of the chapter is applied to the page. FIG. 18 shows a case wherein the check box is not checked.

FIG. 18 shows a state in which "page rotation" setting is changed in "detailed setting for page" of FIG. 17. The control 1701 exhibits a setting of rotating and arranging an original page with the upper portion of the page oriented left in laying out the original page. This item is not a repetitive setting item in the chapter and document, no "follow chapter attribute" check box exists, and the setting displayed in this window is always adopted as the setting value of the page. When the control 1701 is set, the "zoom arrange" item is a repetitive setting item in the chapter, and the setting value of the chapter is used as that of the page.

The "zoom arrange" item is a repetitive setting item in the document. When the "follow document attribute" 1503 is checked in the "zoom arrange" item of the chapter, the setting value of the document in the upper layer is used as that of the chapter, and thus the setting value of the document is used as that of the page. When the "zoom arrange" item is not checked in the chapter, the chapter has a unique setting value, and the setting value unique to the chapter is used as the setting value of the page.

Check box control information set in the setting window may be held in a dedicated region, but is desirably held as one attribute in the setting information shown in FIG. 3. In this case, regions for holding check box control information are added to the lists of FIGS. 5 and 6.

<Example of Document Editing Display of Document Processing System According to Embodiment>

Figure 19:
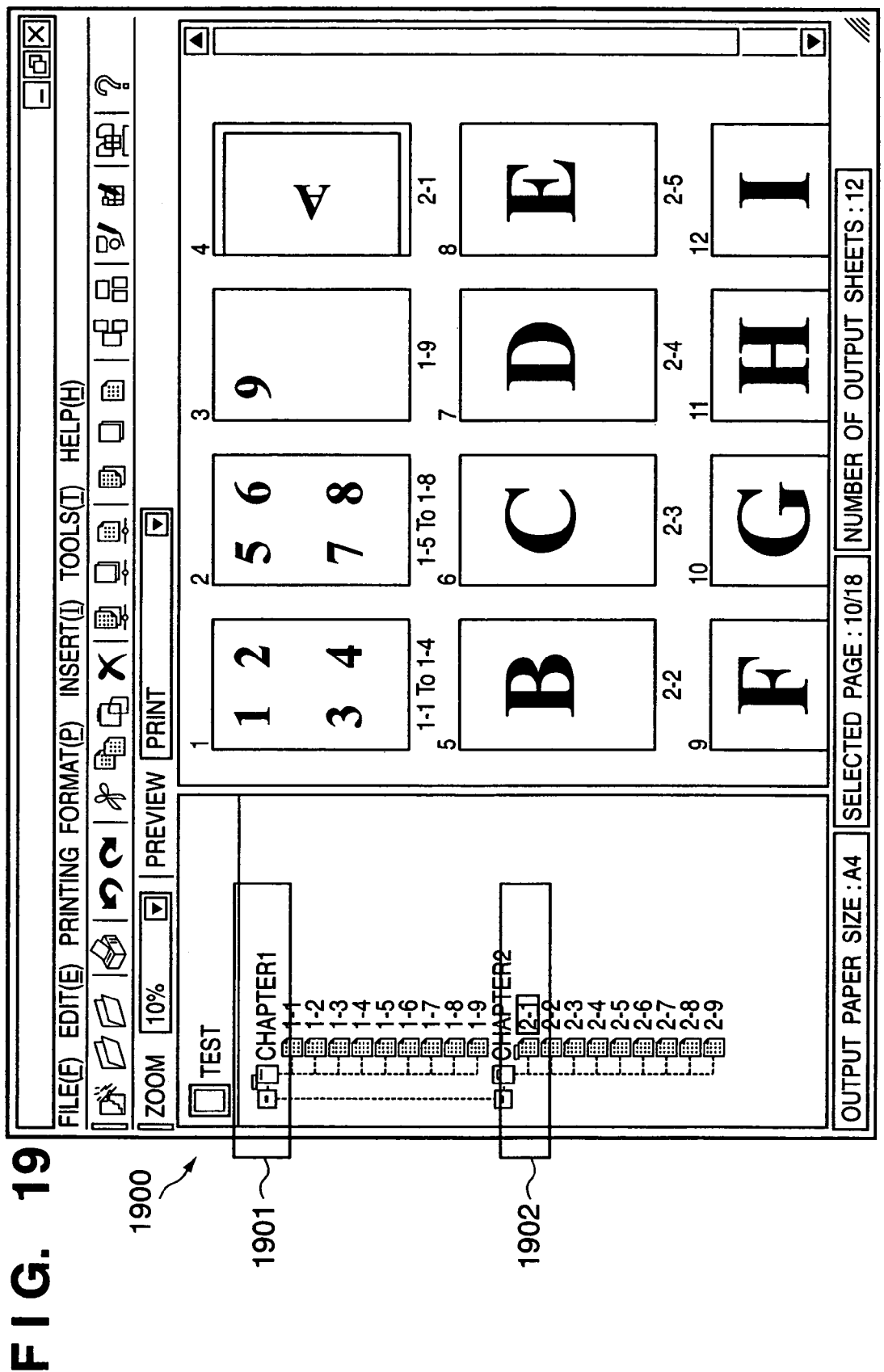
FIG. 19 is a view showing a display example when a setting unique to a chapter or page is performed.

FIG. 19 shows an example of the display format of the application when a setting item which is repeated in an upper layer does not use a setting value in the upper layer, i.e., when the check box control 1501 or 1701 is not checked and an exceptional setting exists in a predetermined unit (in this embodiment, for each chapter or each physical page)

In the example of FIG. 19, a document is formed by two chapters "Chapter1" and "Chapter2", and each chapter has original data of nine pages. FIG. 19 shows a display example when the layout of the first chapter is 4-up (to be also referred to as 4-in-1 hereinafter) and rotation is designated for the first page (10th page in the whole document) of the second chapter. Note that N-up and N-in-1 mean designation of laying out N original pages on one printing page.

At the preview portion on the right side of FIG. 19, four original pages are laid out on each of the first to third pages. On the fourth page, a character "A" is rotated.

The tree view displays a tree in a display format which clearly exhibits to the user an exceptional setting such as a setting unique to a chapter or page, i.e., a setting of a chapter different from that of the whole document or a setting of a page different from that of the whole document. More specifically, the icon of a chapter or page having an exceptional setting is displayed with a shape, color, or design visually identifiable from the icon of a chapter or page having no exceptional setting. In FIG. 19, an icon 1901 corresponding to the first chapter changes in shape to exhibit that this chapter has a unique setting. An icon 1902 corresponding to the first page of the second chapter also changes in shape to exhibit that this page has a special setting.

<Double-Sided/Single-Sided Setting of Each Chapter>

Figure 20B:
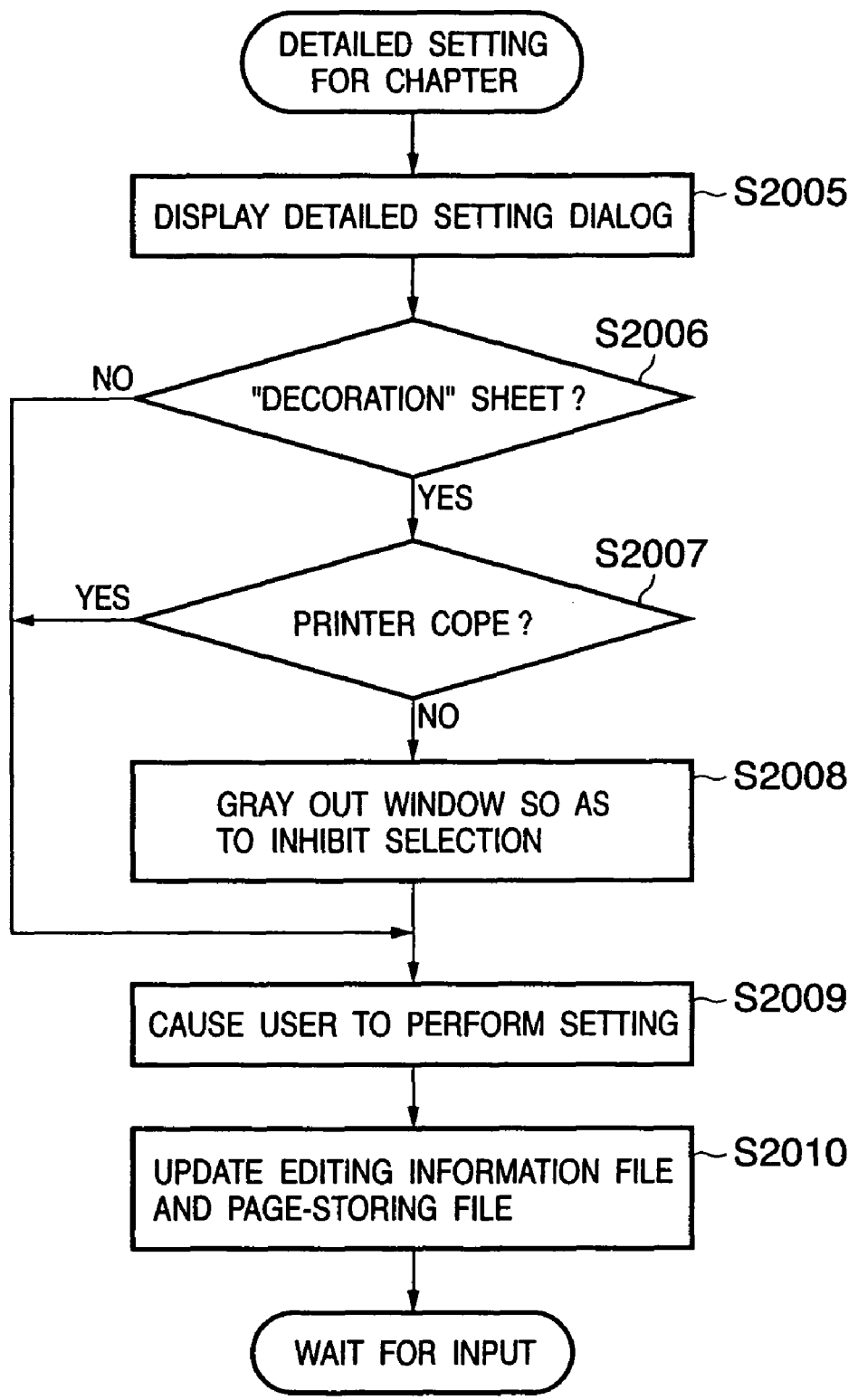

FIGS. 20A and 20B are flow charts showing the processing sequence of the printing control application 104 when single-sided printing or double-sided printing is set for each chapter serving as an intermediate layer.

Figure 21:
FIG. 21 is a view showing an example of a GUI according to the embodiment.

If the user designates detailed setting for a document, the sequence of FIG. 20A starts. A detailed setting dialog for a document is displayed (S2001). A document subjected to detailed setting is a document which has already been selected and opened (i.e., a page-storing file and corresponding editing information file). In this case, a sheet displayed in detailed setting for the document is a "decoration" sheet. In FIG. 21, an item 2101 is used to set the whole document to single-sided printing or double-sided printing. Selectable items are "double-sided printing", "single-sided printing", and "bookbinding printing". In step S2002, the user can set a printing method by selecting one of the options of the item 2101. The user properly sets detailed setting for the document, and then clicks the "OK" button. If the "OK" button is clicked, the processing advances to step S2003, and the printing control application 104 stores the set document attribute as data corresponding to the printing method item No. 1 in FIG. 4A (top column in FIG. 4A) in the editing information file 111. At the same time, as for printing setting data of the page-storing file, setting data of the whole document is updated, and the dialog window of detailed setting for the document shown in FIG. 21 is closed (S2003). In the example of FIG. 21, the whole document is set to double-sided printing.

If double-sided printing is set for the whole document, the printing control application inserts a blank page to the lower surface of the final physical page for a chapter having an odd number of physical pages. This can be realized by, for example, preparing a blank physical page node in advance in a job ticket, and when a physical page node belonging to a chapter, i.e., sheet bundle has an odd number, linking the prepared blank physical page node to the sheet node.

Figure 22:
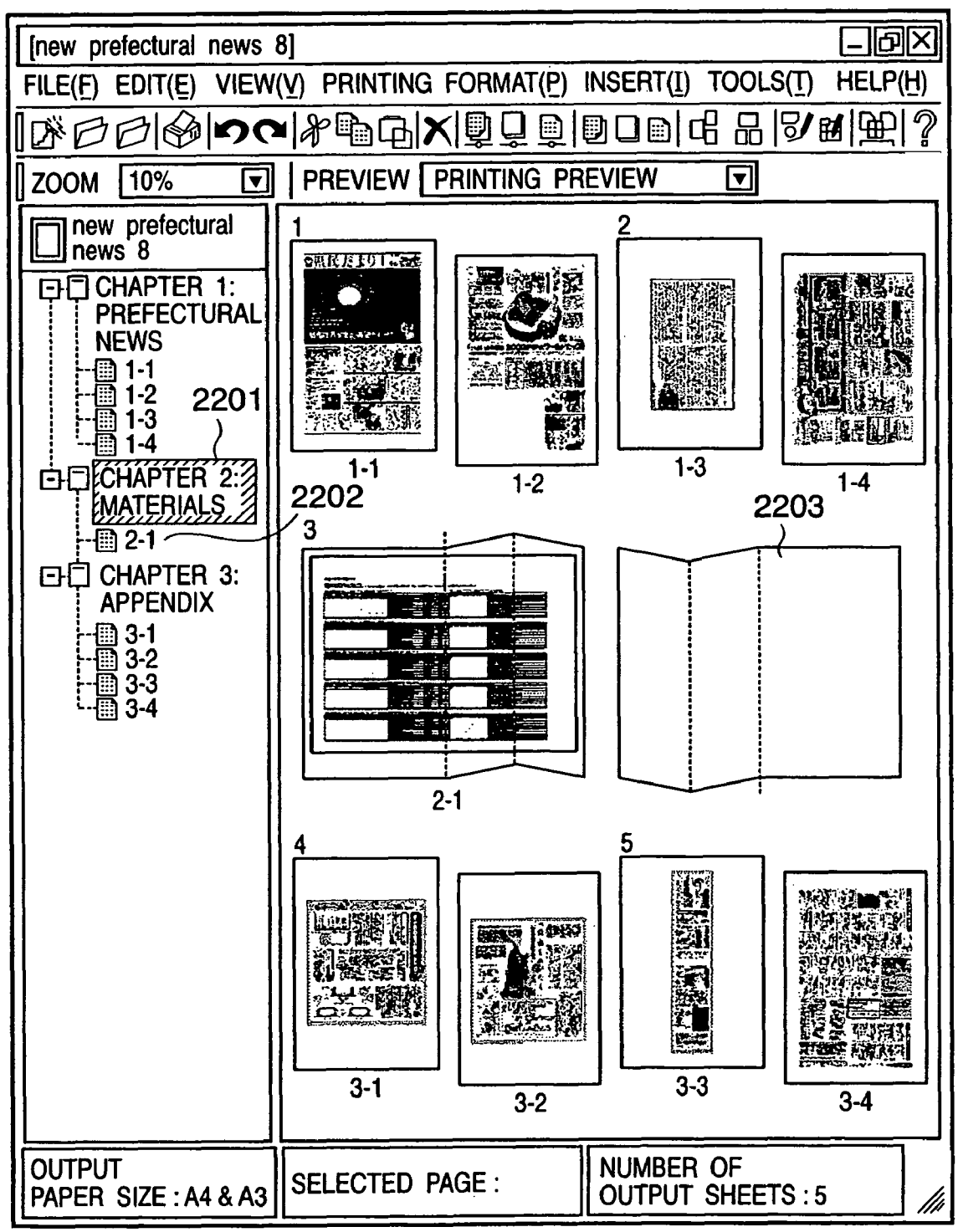
FIG. 22 is a view showing another example of the GUI according to the embodiment.

FIG. 22 shows the printing preview of a whole document when double-sided printing is set for the whole document. A page belonging to a chapter 2201 is an image displayed on the middle stage of the preview window. As is apparent from a page icon 2202 of the chapter 2201 displayed in the tree window, only one page belongs to the chapter 2201. The A3 size and Z-folding are exceptionally designated for the chapter 2201. Since the whole document is set to double-sided printing, a blank page 2203 is added to the lower plane of a page belonging to the chapter 2201. This is a blank page automatically inserted by the printing control application, as described above.

In FIG. 20A, assume that the user opens the detailed setting dialog for the document shown in FIG. 14 from "printing format" of the display window 800 (FIG. 8) of the printing control application 104, and selects double-sided printing setting for the whole document on the "decoration" sheet. If the user selects the chapter 2201 and designates a "detailed setting for chapter" menu from the "printing format" column, processing in FIG. 20B is executed to display a detailed setting dialog shown in FIG. 23 for a selected chapter (S2005).

Figure 23:
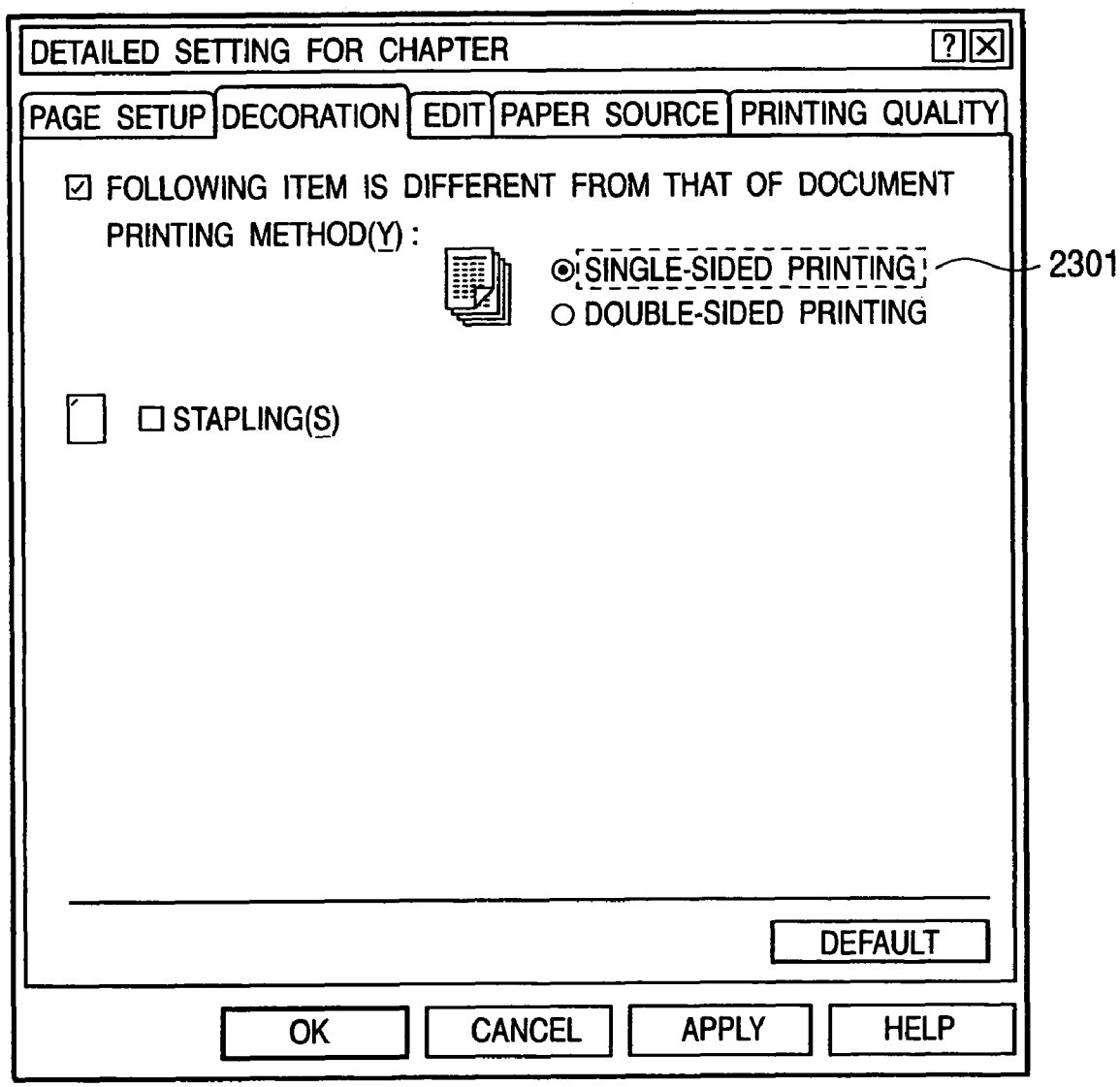
FIG. 23 is a view showing still another example of the GUI according to the embodiment.

A setting of switching between double-sided printing and single-sided printing during one printing job also depends on whether the printer for use provides this function. When a printer which does not cope with switching between double-sided printing and single-sided printing during one printing job is selected as a printer for use, the window in FIG. 23 is entirely grayed out to inhibit any exceptional setting for the chapter by the user.

For this reason, in step S2006, whether the displayed sheet is the "decoration" sheet is determined. If YES in step S2006, whether the printer for use copes with the above-described switching function is determined in step S2007. The printer function can be determined on the basis of model-dependent information acquired by transmitting a command by which the printer driver directly requests a function (model-dependent information) of the printer, acquiring model-dependent information serving as a list of functions provided by the printer, and acquiring the model-dependent information from the printer driver 106 by the printing control application 104. This function is given to a general printer. As another method, the printer function can also be determined such that model-dependent information is held in the printer driver in advance and acquired by the printing control application 104. If the printer does not cope with the double-sided/single-sided switching function in one printing job, the dialog window is grayed out so as to inhibit selection (S2008).

Figure 24:
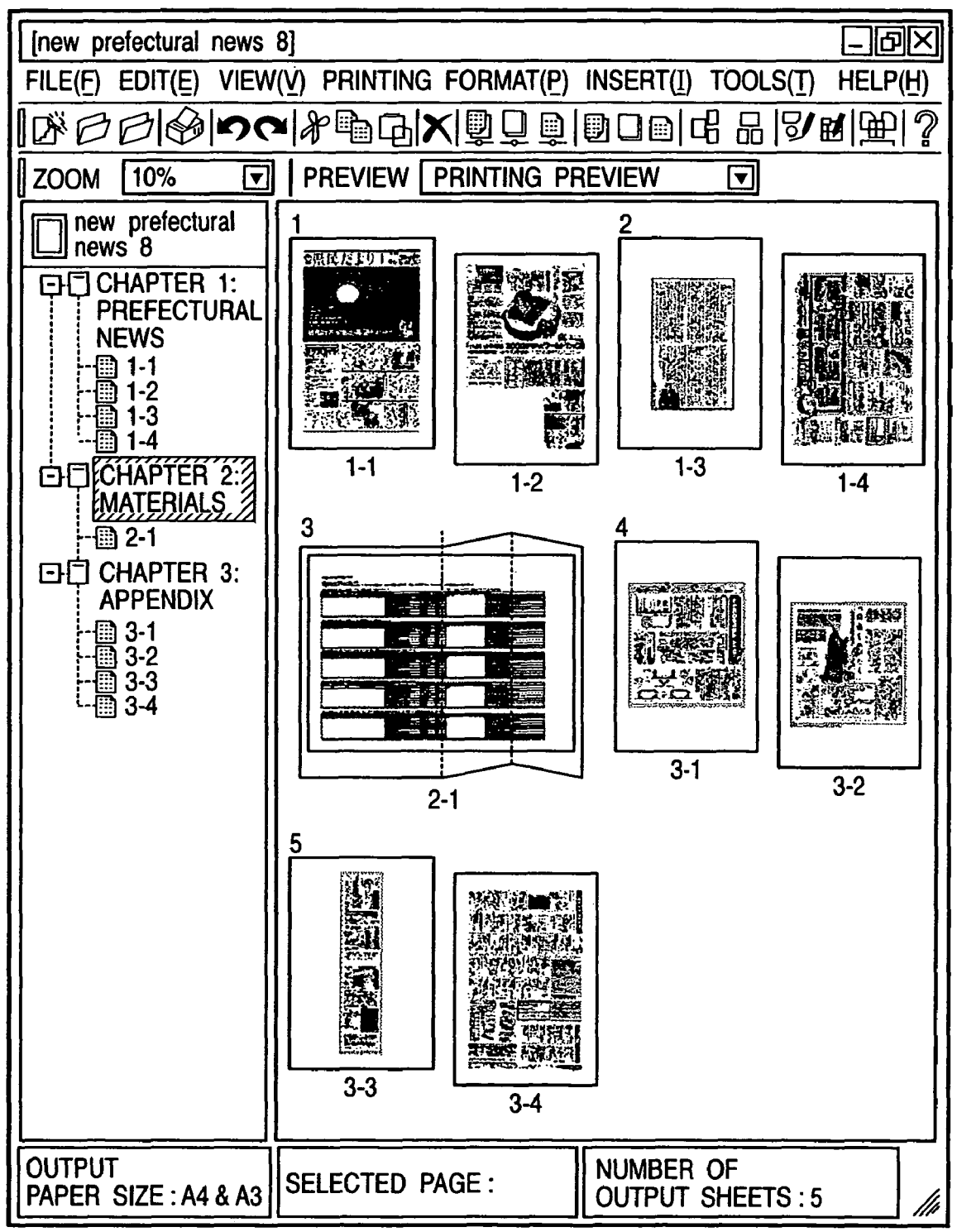
FIG. 24 is a view showing still another example of the GUI according to the embodiment.

In this window, the user can perform setting (S2009). If the user checks an exceptional setting check box "the following item is set different from the document" at an item 2301 when the window in FIG. 23 is so displayed as to allow selection, the option "single-sided printing" or "double-sided printing" of the item 2301 is displayed as a selectable option. If the user selects the option of the item 2301 and clicks the "OK" button, the set exceptional chapter setting is stored as one attribute in the printing method item No. 1 in FIG. 5, and applied as printing setting data of the page-storing file (S2010). At the same time, the dialog window of FIG. 23 is closed. Also, a flag representing the exceptional chapter setting is saved in the printing method item of the editing information file. FIG. 24 shows a printing preview in this case.

After the above printing setting, if the user selects the "printing" item from the "file" menu in the window in FIG. 22 or 24, a printer setting window is displayed. If the user clicks a button for confirming the start of printing, e.g., the "OK" button in this window, the printing control application 104 advances to a printing sequence. This will be explained below with reference to FIG. 25.

Figure 26:
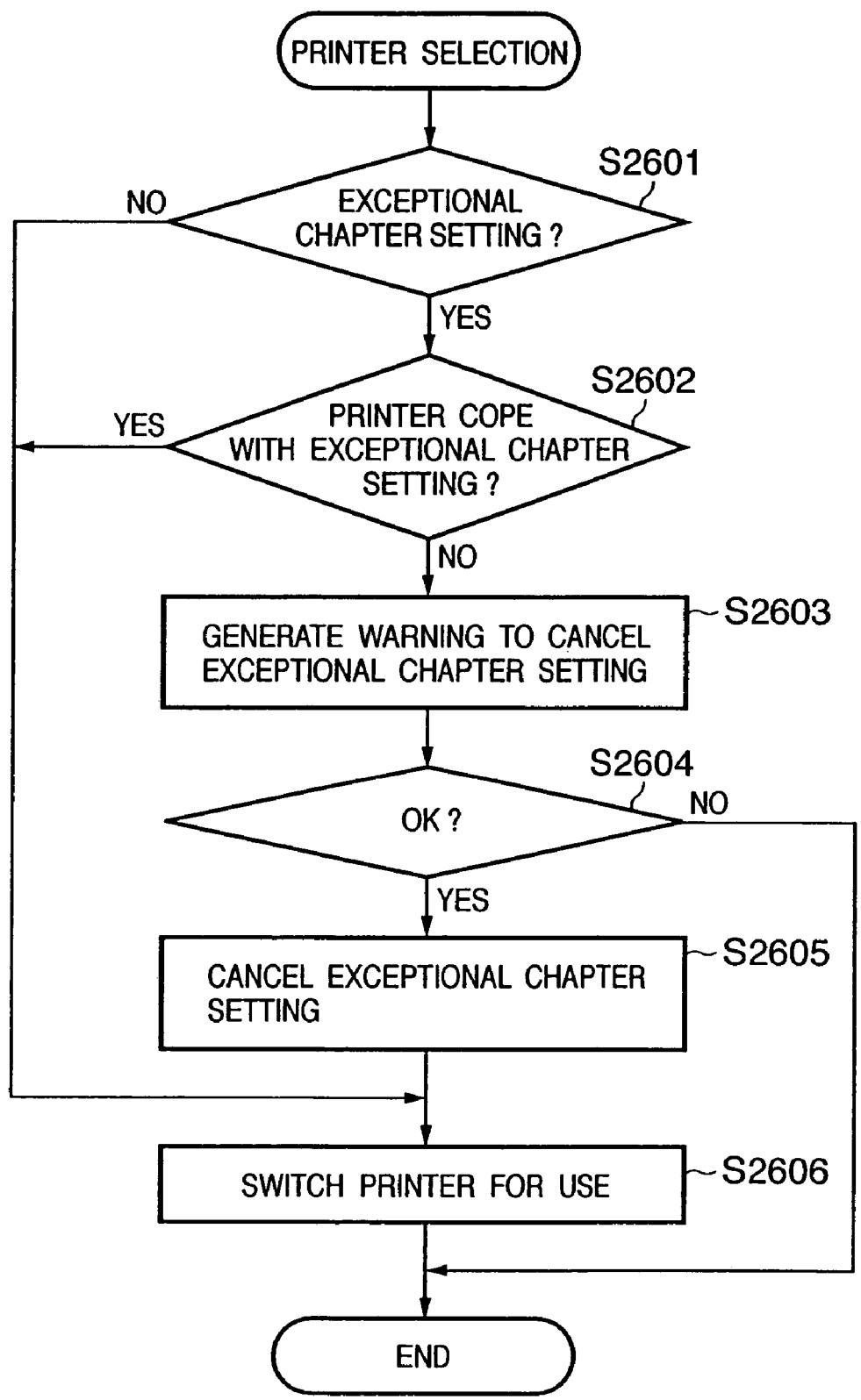
FIG. 26 is a flow chart showing exceptional chapter setting check processing in selecting a printer for use.

When a plurality of printers are available, the printer setting window allows the user to set a desired printer from a list of printers displayed in a "printer for use" column. As described above, some printers cope with switching between double-sided printing and single-sided printing during a printing job, but some do not cope with it. Hence, in selecting a printer for use, printing method setting in the editing information file and page-storing file is tested to determine whether the setting and printer function match each other. FIG. 26 shows a simple sequence.

The sequence of FIG. 26 is executed by the printing control application when one printer is selected from the "printer for use" column and the printer for use changes before and after selection. The printing control application 104 refers to "printing method" among the chapter attributes of the editing information file, and determines whether an exceptional chapter setting exists (S2601). This determination is achieved by referring to, e.g., a flag saved in correspondence with whether "the following item is set different from the document" check box in FIG. 23 has been checked.

If YES in step S2601, whether a printer selected as a printer for use copes with the exceptional chapter setting, i.e., whether the printer has a function of switching between double-sided printing and single-sided printing during a printing job is determined (S2602).

If a printer which does not cope with the exceptional chapter setting has been selected, the printing control application 104 warns the user by a display or sound that the exceptional chapter setting in chapter attribute settings will be canceled if the current printer is determined as a printer for use (S2603). The printing control application 104 determines whether the OK button in the displayed warning dialog has been clicked (S2604). If the user confirms the printer for use with the OK button or the like, the printing control application 104 cancels the exceptional chapter setting. That is, the printing control application 104 cancels the exceptional chapter setting flag from the printing method among the chapter attributes of the editing information file, and deletes setting data different from that of the document. This also applies to the page-storing file. The printing control application 104 deletes the printing method setting different from that of the whole document, from printing setting data of the sheet bundle (S2605).

The printing control application 104 switches the printer for use to a newly selected printer, ending printer selection (S2606).

If no exceptional chapter setting exists in step S2601 or the selected printer copes with the exceptional chapter setting in step S2602, the processing advances to step S2606, and the printing control application 104 sets the selected printer as a printer for use.

If the user is determined in step S2604 not to express any agreement with the OK button or the like, printer selection processing ends.

If a printer which cannot cope with printing has been selected, all chapter printing method items shown in No. 1 of FIG. 5 are changed to "follow the designation of the whole document". The printing method designation in the dialog is grayed out to inhibit selection.

<Processing Sequence by Printing Application>

An operation when the printing application (despooler) 105 receives printing instruction processing from the printing control application 104 will be explained.

Figure 25:
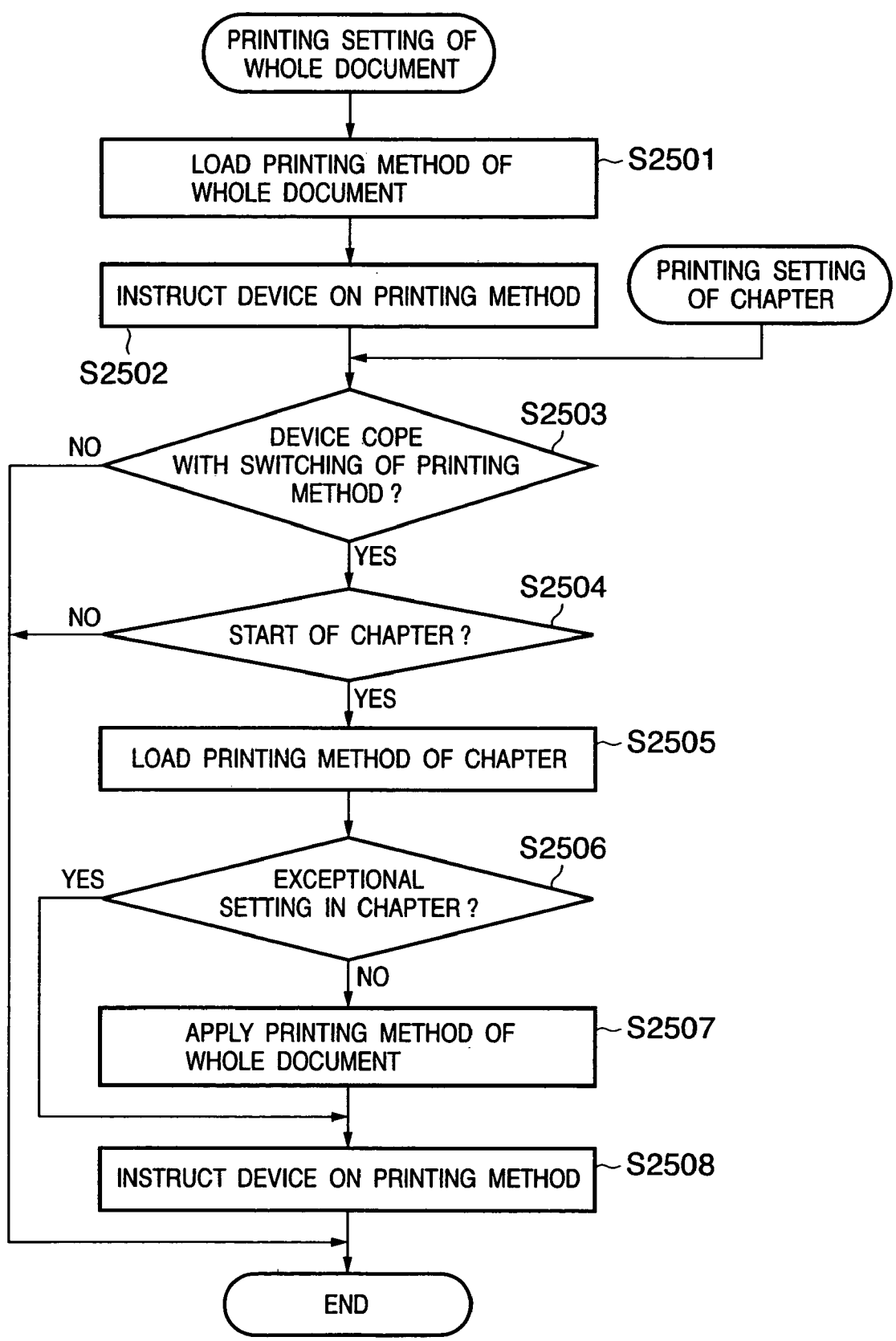
FIG. 25 is a flow chart when each setting value is read out to print according to the embodiment.

FIG. 25 is a flow chart showing processing of instructing a device on the printing method, which is executed for each document or chapter by the printing application 105 in printing after the above-described printing setting. This processing is executed at the start of a document from step S2501, and executed at the start of a chapter from step S2503. As for the first chapter, processing is done subsequently to document setting.

Figure 27:
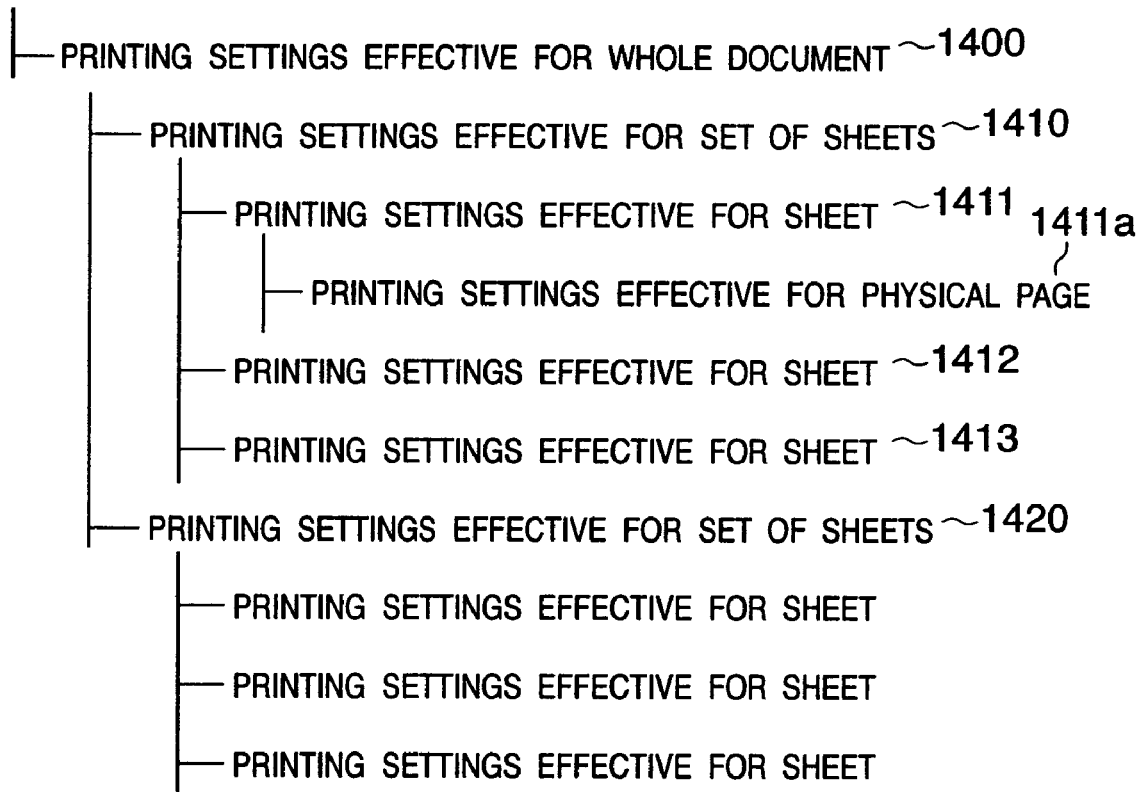
FIG. 27 is a view showing an example of a despool table.

If the printing control application 104 issues a printing instruction, it generates despool table data on the basis of the contents of the page-storing file 103 and editing information file 111. FIG. 27 shows an example of the despool table. This data has a structure obtained by mapping a job ticket which constitutes a page-storing file in the memory with almost no change. Similar to the job ticket, the data contains printing setting data set for each layer such as a whole document, sheet bundle, sheet, or physical page.

When settings comply with those of an upper layer, the job ticket need not hold settings in each layer. In this case, the job ticket holds the values of unique setting items (unique items) which are not defined in an upper layer in settings of a sheet, sheet bundle, or physical page, and the values of only items (exceptional items) having exceptional settings different from those of an upper layer out of items common to setting items in the upper layer. The despool table similarly holds exceptional items and unique items as printing settings in FIG. 27 for each layer.

The printing application 105 which has received the despool table loads it to acquire the printing method of the whole document (S2501). The printing method of the whole document includes a printing method for the whole document, i.e., single-sided printing/double-sided printing for the whole document and printing method designation for a sheet bundle. For example, the despool table is regarded as a tree structure and scanned in the page order to read out printing setting data contained in each node or the node of a physical page serving as a leaf. Printing setting data of each layer such as a document, chapter, or sheet can be read out in the page order.

The printing application 105 instructs the device via the graphic engine 121 on the printing method of the whole document (S2502).

The printing application 105 determines whether the device, i.e., the printer for use copes with switching of the printing method (S2503). This determination can be performed by the same method as the above-described checking method of the printing control application 104 in designating a printing method as an exceptional chapter setting. When a check result is held, this determination can also be achieved by the held value.

If settings can be switched for each chapter, switching in each chapter is determined in step S2503 and subsequent steps.

The printing application 105 determines the start of a chapter (S2504). If a document node shifts to a sheet bundle node while reading out setting data or original data from the despool table, this point can be recognized as the start of a sheet bundle, i.e., chapter. In this manner, whether the current point is the start of a chapter, i.e., sheet bundle can be determined. If the current point is determined to be the start of a chapter, the printing application 105 reads printing setting data of the chapter (to be referred to as a chapter of interest hereinafter) and a printing method contained in the data (step S2505). The printing application 105 determines whether a printing method has been designated as an exceptional setting of the chapter of interest (step S2506).

If no exceptional chapter setting exists, the printing application 105 directly sets the printing method of the whole document as the printing method of the chapter, and sets the printing method as a parameter to be sent to the device (S2507).

In step S2508, the printing application 105 instructs the device via the graphic engine 121 on the printing method of the exceptional chapter setting read in step S2505 or the printing method of the whole document set in step S2507.

The printing application 105 performs the above sequence at the start of the document from step S2501 and at each chapter from step S2503.

For Windows®, this setting is done by issuing a reset DC from the printing application 105 to the GDI to set DEVMODE and switching single-sided/double-sided printing.

More specifically, the despooler sets attributes for each member of the DEVMODE structure, and then calls ResetDC( ) serving as a GDI function by using DEVMODE as an argument. The DEVMODE contents are then transmitted to the driver via the graphic engine, and the driver controls the printer on the basis of the attributes. The DEVMODE structure may be contained in the page-storing file together with content data and printing setting data. In this case, a value in the page-storing file is used. If no DEVMODE structure is contained in the page-storing file, a value given as a return value from the driver via the graphic engine upon calling CreateDC( ) serving as a GDI function by the despooler to the driver is used.

An example of a single-sided/double-sided instruction will be described. When a document or chapter has single-sided printing setting, the despooler sets the attribute value of single-sided printing in a member which determines a single-sided/double-sided instruction in the DEVMODE structure. After that, the despooler calls and issues ResetDC( ) serving as a GDI function by using DEVMODE as an argument. The DEVMODE value is transmitted to the driver via the graphic engine, and the driver reads out a double-sided/single-sided member and instructs the printer on the single-sided printing mode on the basis of the attribute value (=single-sided printing).

In the above fashion, printing methods are set for a document and each chapter. A printing instruction command is issued to the graphic engine for each printing page of each chapter to execute actual printing processing.

The printing instruction is a structure for issuing an instruction from an application to a device via a graphic engine and driver. The printing instruction also depends on the device, and is created by the graphic engine 121 via the driver 106. For this purpose, the printing application 105 creates data to be processed by the graphic engine 121. The created data is identical to data created by an application program which prints via the graphic engine. That is, the printing application converts a page designated as a printing target by the printing control application and the printing settings of the page in accordance with a data format for transfer to the graphic engine.

The GDI serving as a graphic engine in Windows® manages image information processing to a display card or printer. The GDI dynamically links a module called a device driver, and performs output processing to each device in order to absorb the dependence of the device such as a display card or printer. The device driver for a printer is the printer driver 106. The printer driver 106 has a basic function group called DDI (Device Driver Interface) which is determined to be installed in the device driver in advance in accordance with the performance and function. The GDI converts an API (Application Programming Interface) call by the printing application into device driver data. The DDI function group is properly called by the GDI to generate the above-mentioned printing instruction, and this instruction is transmitted to the printer 107 via the spooler 122. The GDI sequentially processes a printing request from the printing application 105 via the printer driver. When the printer 107 is equipped with a controller capable of processing a printing mode command called PDL (Printer Description Language), the printer driver 106 performs processing of replacing drawing information having a high degree of abstraction with the PDL. This printing mode command includes a color command or monochrome command.

The printing mode command created by the graphic engine 121 and printer driver 106 is output from the printer driver 106, and temporarily held by the spooler 122. The printing mode command is then transmitted from the spooler 122 to the printer 107 asynchronously to printing mode command generation processing. In this processing, a printing instruction is transmitted to the device.

If the printer 107 receives a command for switching the printing method, the printer 107 changes single-sided printing/double-sided printing in accordance with the command, and performs actual image formation processing.

With this arrangement, the printing system according to the embodiment can set a printing method different from that of a whole document in a chapter desired by the user in a document created by an application. Printing is performed in accordance with the set printing method.

When an exceptional setting different from that of a whole document is done for a chapter, whether this setting can be realized by a printer is determined. When the exceptional setting is possible, it can be reliably realized.

When the setting cannot be realized in the printer, the setting is inhibited to prevent any inconsistency between settings and an actual use environment.

Also when the printer for use is changed and the setting cannot be realized in a newly designated printer for use, a warning to cancel such exceptional chapter setting is generated. If the user agrees on cancellation, the exceptional chapter setting is canceled. Hence, even if the printer is changed, inconsistency between settings and an actual use environment can be prevented.

As described above, a document including both single-sided printing and double-sided printing can be executed by one printing job by generating for a document to be printed a printing job which holds single-sided printing or double-sided printing setting as a partial setting value, and causing the printer to execute the printing job. An expressive document can, therefore, be created, and efficient printing can be performed in terms of the speed and maintenance cost without printing any wasteful blank page.

In FIG. 25, if the device copes with setting switching, a printing method setting instruction is issued to the device regardless of the presence/absence of an exceptional chapter setting. Alternatively, the printing method of an immediately preceding chapter is stored, and when different printing methods are set in a chapter of interest and immediately preceding chapter, a printing method setting instruction can be issued to the device at the start of the chapter of interest. In this case, no exceptional chapter setting can be done unless the device copes with switching of the printing method, and determination in step s2503 can be omitted. In this case, issuing of a setting switching instruction can be prevented when no setting is switched.

Note that the order of flow charts described in the embodiment can be changed as far as processing is completed.

The present invention may be applied to a system including a plurality of devices (e.g., a host computer, interface device, reader, and printer) or an apparatus (e.g., a copying machine, printer, or facsimile apparatus) formed from a single device.

The object of the present invention is also achieved when a storage medium which stores software program codes for realizing the functions of the above-described embodiment are read out and executed by the computer (or the CPU or MPU) of a system or apparatus. In this case, the program codes read out from the storage medium realize the functions of the above-described embodiment, and the storage medium which stores the program codes constitutes the present invention.

The storage medium for supplying the program codes includes a floppy® disk, hard disk, optical disk, magnetooptical disk, CD-ROM, CD-R, magnetic tape, nonvolatile memory card, and ROM.

The functions of the above-described embodiment are realized when the computer executes the readout program codes. Also, the functions of the above-described embodiment are realized when an OS (Operating System) or the like running on the computer performs part or all of actual processing on the basis of the instructions of the program codes.

Also, the functions of the above-described embodiment are realized when the program codes read out from the storage medium are written in the memory of a function expansion board inserted into the computer or the memory of a function expansion unit connected to the computer, the CPU of the function expansion board or function expansion unit performs part or all of actual processing on the basis of the instructions of the program codes.

As has been described above, according to the present invention, a document including both single-sided printing and double-sided printing can be printed by one printing job by generating a printing job which holds single-sided printing or double-sided printing setting as a partial setting value in a document to be printed, and causing a printer to execute the printing job. An expressive document can be created, and efficient printing can be performed in terms of the speed and maintenance cost without printing any wasteful blank page.

As many apparently widely different embodiments of the present invention can be made without departing from the spirit and scope thereof, it is to be understood that the invention is not limited to the specific embodiments thereof except as defined in the appended claims.

What is claimed is:

1. A printing control method for controlling a printing job which includes a plurality of groups, wherein each group is composed of at least one page, comprising:

a displaying step of displaying a printing job including the plurality of groups on a screen in which each group is discriminable;

a first setting step of setting an attribute representing whether to print on only one side or two sides of a paper sheet to the printing job;

a second setting step of setting an attribute representing whether to print on only one side or the two sides of a paper sheet to a group selected on the screen from the plurality of groups, wherein the attribute different from the attribute set in the first setting step is settable in the second setting step; and an instruction step of, if the group to which the attribute is set in the second setting step exists, instructing a printer to print the page included in the group to which the attribute is set in the second setting step based on the attribute set in the second setting step.

2. The method according to claim 1, wherein the attribute that the printer doesn't support isn't settable in the second setting step.

3. The method according to claim 1, wherein the printer is instructed in said instructing step to print the page included in the group to which the attribute is not set in the second setting step, based on the attribute set in the first setting step.

4. A printing control apparatus for controlling a printing job which includes a plurality of groups, wherein each group is composed of at least one page, comprising:
- a displaying unit constructed to display a printing job including the plurality of groups on a screen in which each group is discriminable;
- a first setting unit constructed to set an attribute representing whether to print on only one side or two sides of a paper sheet to the printing job;
- a second setting unit constructed to set an attribute representing whether to print on only one side or the two sides of a paper sheet to a group selected on the screen from the plurality of groups, wherein the attribute different from the attribute set in the first setting unit is settable in the second setting unit; and
- an instruction unit constructed to, if the group to which the attribute is set in the second setting unit exists, instruct a printer to print the page included in the group to which the attribute is set in the second setting unit based on the attribute set in the second setting unit.

5. The printing control apparatus according to claim 4, wherein the attribute that the printer doesn't support isn't settable by the second setting unit.

6. The printing control apparatus according to claim 4, wherein the printer is instructed by said instructing unit to print the page included in the group to which the attribute is not set in the second setting unit, based on the attribute set by the first setting unit.

7. A non-transitory computer-readable storage medium storing a computer-executable program for a printing control method of controlling a printing job which includes a plurality of groups, wherein each group is composed of at least one page, comprising:
- a displaying step of displaying a printing job including the plurality of groups on a screen in which each group is discriminable;
- a first setting step of setting an attribute representing whether to print on only one side or two sides of a paper sheet to the printing job;
- a second setting step of setting an attribute representing whether to print on only one side or the two sides of a paper sheet to a group selected on the screen from the plurality of groups, wherein the attribute different from the attribute set in the first setting step is settable in the second setting step; and
- an instruction step of, if the group to which the attribute is set in the second setting step exists, instructing a printer to print the page included in the group to which the attribute is set in the second setting step based on the attribute set in the second setting step.

8. The non-transitory computer-readable storage medium according to claim 7, wherein the attribute that the printer doesn't support isn't settable in the second setting step.

9. The non-transitory computer-readable storage medium according to claim 7, wherein the printer is instructed in said instructing step to print the page included in the group to which the attribute is not set in the second setting step, based on the attribute set in the first setting step.

* * * * *